(12) United States Patent
Ahmed et al.

(10) Patent No.: US 10,313,068 B1
(45) Date of Patent: Jun. 4, 2019

(54) SIGNAL MONITORING AND MEASUREMENT FOR A MULTI-WIRE, MULTI-PHASE INTERFACE

(71) Applicant: QUALCOMM Incorporated, San Diego, CA (US)

(72) Inventors: Yasser Ahmed, San Diego, CA (US); Ying Duan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/961,687

(22) Filed: Apr. 24, 2018

(51) Int. Cl.
*H04B 3/46* (2015.01)
*H04L 1/20* (2006.01)

(52) U.S. Cl.
CPC ............... *H04L 1/203* (2013.01); *H04B 3/46* (2013.01)

(58) Field of Classification Search
CPC ........ G06F 13/4295; H04L 1/203; H04B 3/46
See application file for complete search history.

(56) References Cited

U.S. PATENT DOCUMENTS

| | | | |
|---|---|---|---|
| 9,397,872 B2 | 7/2016 | Kamali | |
| 9,473,291 B2 | 10/2016 | Kil et al. | |
| 9,544,069 B2 | 1/2017 | Whitby-Strevens et al. | |
| 9,553,635 B1 | 1/2017 | Sejpal et al. | |
| 2014/0348214 A1* | 11/2014 | Sengoku | H04L 7/04 375/147 |
| 2017/0264379 A1* | 9/2017 | Wiley | H04B 17/21 |

* cited by examiner

*Primary Examiner* — Sung S Ahn
(74) *Attorney, Agent, or Firm* — Loza & Loza, LLP/Qualcomm

(57) ABSTRACT

Methods, apparatus, and systems for monitoring and measuring signal characteristics for signals received over a multi-wire, multi-phase interface are disclosed. Signals present on each line of a 3-line communication interface are sampled using auxiliary samplers having a programmable time delay to delay the sampled signal by a set time, as well as a programmable voltage offset. The auxiliary sampler outputs are compared with direct line samples of signals on each of the three lines to generate error signals. From this comparison, an array of error signal data occurring over a particular sampling period may be generated. In turn, waveform characteristics can be determined from the error signal data, such as an eye-pattern. Furthermore, skew measurement may further be effectuated using the auxiliary samplers but determining the time difference of when the error signals of the different wires cross a predetermined threshold.

30 Claims, 20 Drawing Sheets

SIGNAL MONITORING AND MEASUREMENT FOR A MULTI-WIRE, MULTI-PHASE INTERFACE

TECHNICAL FIELD

The present disclosure relates generally to high-speed data communications interfaces, and more particularly, to monitoring and measuring characteristics of a signal on a multi-wire, multi-phase data communication link.

INTRODUCTION

Manufacturers of mobile devices, such as cellular phones, may obtain components of the mobile devices from various sources, including different manufacturers. For example, an application processor in a cellular phone may be obtained from one manufacturer, while an imaging device or camera may be obtained from another manufacturer, and a display may be obtained from yet another manufacturer. The application processor, the imaging device, the display controller, or other types of device may be interconnected using a standards-based or proprietary physical interface. In one example, an imaging device may be connected using the Camera Serial Interface (CSI) defined by the Mobile Industry Processor Interface (MIPI) Alliance. In another example, a display may include an interface that conforms to the Display Serial Interface (DSI) standard specified by MIPI. Further, a multiphase, multi-wire physical layer standard MIPI C-PHY may be utilized to provide high throughput performance over bandwidth-limited channels for connecting displays and cameras to the application processor.

In particular, the multiphase, multi-wire (C-PHY) interface defined by the MIPI Alliance uses three wires or conductors to transmit information between devices. Each of the three wires may be in one of various voltage signaling levels during transmission of a symbol over the C-PHY interface, where clock timing is encoded into each symbol requiring that the combination of voltages driven onto the wires must change at every symbol boundary. During the initial time period of the symbol after a symbol boundary, the voltages on the lines will be in transient states where each of the wires is transitioning between various different voltage levels or steps, with this period having uncertainty of signal states. After this initial transition period, the voltages on the lines will move toward a steady state where the symbol and encoded information may be determined. This steady state period may be characterized with an eye diagram or pattern, which is a useful tool to specify the signal characteristics. In order to support higher data rates in a three-wire signaling system such as a C-PHY system, a need exists for improved test features to properly monitor the eye formation, which becomes smaller with increased data rates, as well as measure skew between the three wires as seen at the receiver end of the 3-wire interface.

SUMMARY

Embodiments disclosed herein provide systems, methods and apparatus that enable improved communications on a multi-wire and/or multiphase communications link.

In an aspect of the disclosure, a method for characterizing a waveform received in a data communication device coupled to a 3-line communication interface is disclosed. The method includes sampling signals present on each line of the 3-line communication interface using a plurality of first samplers, where a respective first sampler of the plurality of first samplers samples each line, wherein each sampler includes at least one of a programmable time delay and a programmable voltage offset configured to respectively delay the sampled signal by a time amount or determine a voltage offset. Further, the method includes comparing the outputs of each first sampler with respective direct line samples of signals on each of the three lines of the 3-line communication interface to generate error signals, where the direct line samples are sampled using a plurality of second samplers, each of which is coupled to a respective line of the 3-line communication interface, and then generating an array of error signal data over time using the comparison of the sample outputs and the line samples. The method also includes then determining waveform characteristics based on the array of error signal data.

According to another aspect, an apparatus for characterizing a waveform received in a data communication device coupled to a 3-line communication interface is disclosed. The apparatus includes means for sampling signals present on each line of the 3-line communication interface using a plurality of first samplers, where a respective first sampler of the plurality of first samplers samples each line, wherein each sampler includes at least one of a programmable time delay and a programmable voltage offset configured to respectively delay the sampled signal by a time amount or determine a voltage offset. Further, the apparatus features means for sampling direct line signals using a plurality of second samplers. Moreover, the apparatus includes means for comparing the outputs of each first sampler with respective direct line samples from each of the second samplers for each of the three lines of the 3-line communication interface to generate error signals, and means for generating an array of error signal data over time using the comparison of the sample outputs and the line samples from the means for comparing. Additionally, the apparatus includes means for determining waveform characteristics based on the array of error signal data.

In yet another aspect, the present disclosure provides for a non-transitory processor readable storage medium comprising code for sampling signals present on each line of a 3-line communication interface using a plurality of first samplers, where a respective first sampler of the plurality of first samplers samples each line, wherein each sampler includes at least one of a programmable time delay and a programmable voltage offset configured to respectively delay the sampled signal by a time amount or determine a voltage offset. The medium also includes code for comparing the outputs of each first sampler with respective direct line samples of signals on each of the three lines of the 3-line communication interface to generate error signals, where the direct line samples are sampled using a plurality of second samplers, each of which is coupled to a respective line of the 3-line communication interface. Still further, the medium includes code for generating an array of error signal data over time using the comparison of the sample outputs and the line samples, and determining waveform characteristics based on the array of error signal data.

In still another aspect, a system for characterizing a waveform received in a data communication device coupled to a 3-line communication interface is disclosed. The system includes a first sampling circuitry in a receiver that is configured to sample signals present on each line of the 3-line communication interface wherein the first sampling circuitry includes at least one of a programmable time delay and a programmable voltage offset configured to respectively delay the sampled signal by a time delay amount or determine a voltage offset. Further, the system includes a second sampling circuitry in the receiver that is configured to directly sample the signal on each line of the 3-line communication interface. Furthermore, the system includes a comparison circuitry configured to compare the outputs of the first sampling circuitry and the second sampling circuitry over a plurality of time delay amounts and a plurality of voltage offsets to generate a plurality of error signals, and an error signal array generator configured to generate an array of error signal data over time using the plurality of error signals. Finally, the system includes waveform characteristic determination circuity configured to determine waveform characteristics of the signals received on the 3-line communication interface based on the array of error signal data.

DETAILED DESCRIPTION

Figure 1:
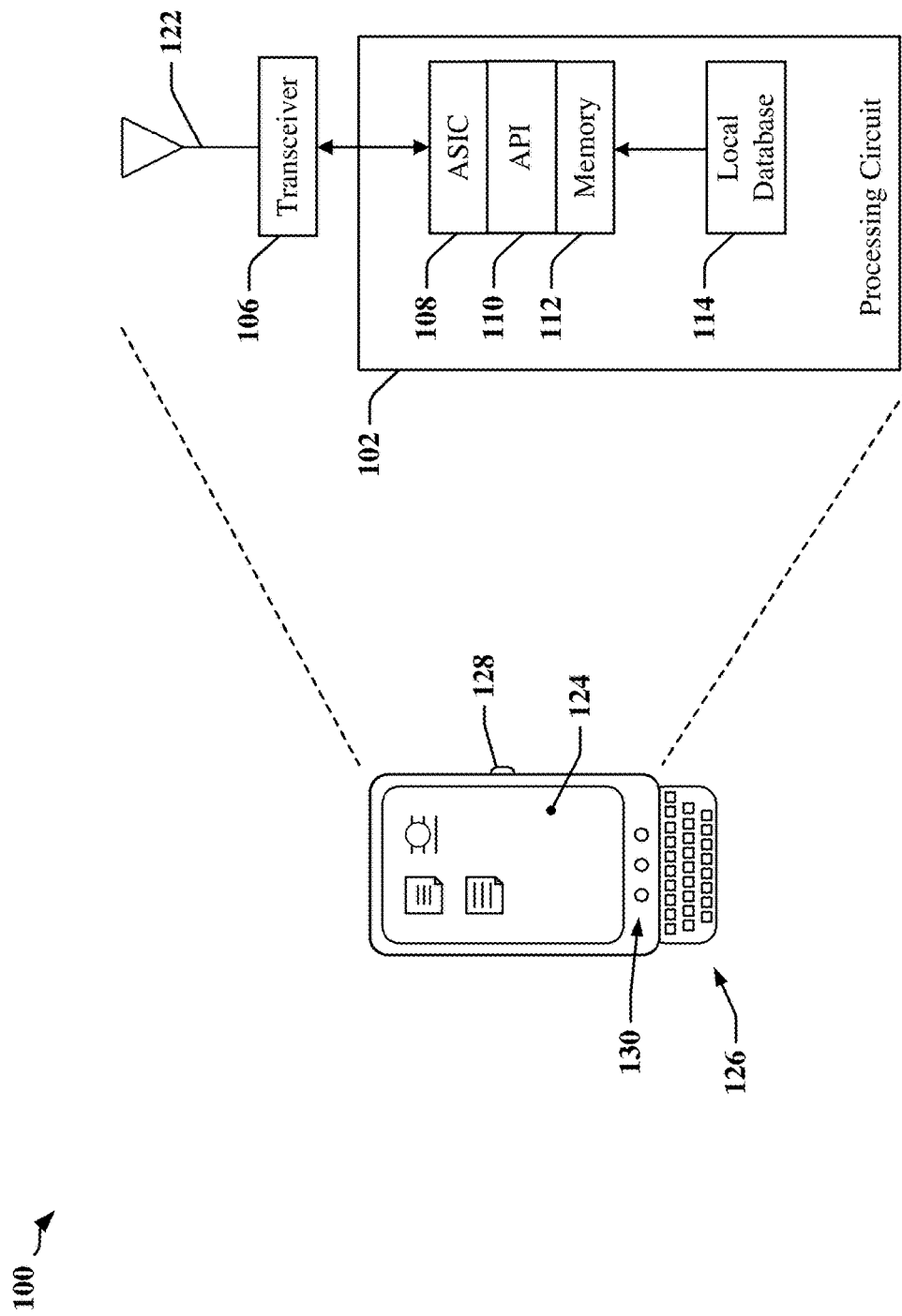
FIG. 1 depicts an apparatus employing a data link between IC devices that selectively operates according to one of plurality of available standards.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

As used in this application, the terms "component," "module," "system" and the like are intended to include a computer-related entity, such as, but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Overview of C-PHY Interface

Certain aspects of the invention may be applicable to a C-PHY interface specified by the MIPI Alliance, which may be deployed to connect electronic devices that are subcomponents of a mobile apparatus such as a telephone, a mobile computing device, an appliance, automobile electronics, avionics systems, etc. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multi-media device, a video device, a digital audio player (e.g., MP3 player), a camera, a game console, a wearable computing device (e.g., a smartwatch, a health or fitness tracker, etc.), an appliance, a sensor, a vending machine, or any other similarly functioning device.

The C-PHY interface is a high-speed serial interface that can provide high throughput over bandwidth-limited channels. The C-PHY interface may be deployed to connect application processors to peripherals, including displays and cameras. The C-PHY interface encodes data into symbols that are transmitted in a three-phase signal over a set of three wires, which may be referred to as a trio, or trio of wires. The three-phase signal is transmitted on each wire of the trio in different phases. Each three-wire trio provides a lane on a communications link. A symbol interval may be defined as the interval of time in which a single symbol controls the signaling state of a trio. In each symbol interval, one wire is "undriven" while the remaining two of the three wires are differentially driven such that one of the two differentially driven wires assumes a first voltage level and the other differentially driven wire assumes to a second voltage level different from the first voltage level. The undriven wire may float, be driven, and/or be terminated such that it assumes a third voltage level that is at or near the mid-level voltage between the first and second voltage levels. In one example, the driven voltage levels may be +V and −V with the undriven voltage being 0 V. In another example, the driven voltage levels may be +V and 0 V with the undriven voltage being +V/2. Different symbols are transmitted in each consecutively transmitted pair of symbols, and different pairs of wires may be differentially driven in different symbol intervals.

FIG. 1 depicts an example of apparatus 100 that may employ a C-PHY 3-phase communication link. The apparatus 100 may include a wireless communication device that communicates through a radio frequency (RF) communications transceiver 106 with a radio access network (RAN), a core access network, the Internet and/or another network. The communications transceiver 106 may be operably coupled to a processing circuit 102. The processing circuit 102 may include one or more IC devices, such as an application-specific IC (ASIC) 108. The ASIC 108 may include one or more processing devices, logic circuits, and so on. The processing circuit 102 may include and/or be coupled to processor readable storage such as memory devices 112 that may include processor-readable devices that store and maintain data and instructions for execution or for other use by the processing circuit 102 and devices, and/or memory cards that support a display 124. The processing circuit 102 may be controlled by one or more of an operating system and an application programming interface (API) 110 layer that supports and enables execution of software modules residing in storage media, such as the memory device 112 of the wireless device. The memory devices 112 may include read-only memory (ROM), dynamic random-access memory (DRAM), one or more types of programmable read-only memory (PROM), flash cards, or any memory type that can be used in processing systems and computing platforms. The processing circuit 102 may include or access a local database 114 that can maintain operational parameters and other information used to configure and operate the apparatus 100. The local database 114 may be implemented using one or more of a database module, flash memory, magnetic media, electrically-erasable PROM (EEPROM), optical media, tape, soft or hard disk, or the like. The processing circuit may also be operably coupled to external devices such as an antenna 122, the display 124, operator controls, such as a button 128 and a keypad 126 among other components.

Figure 2:
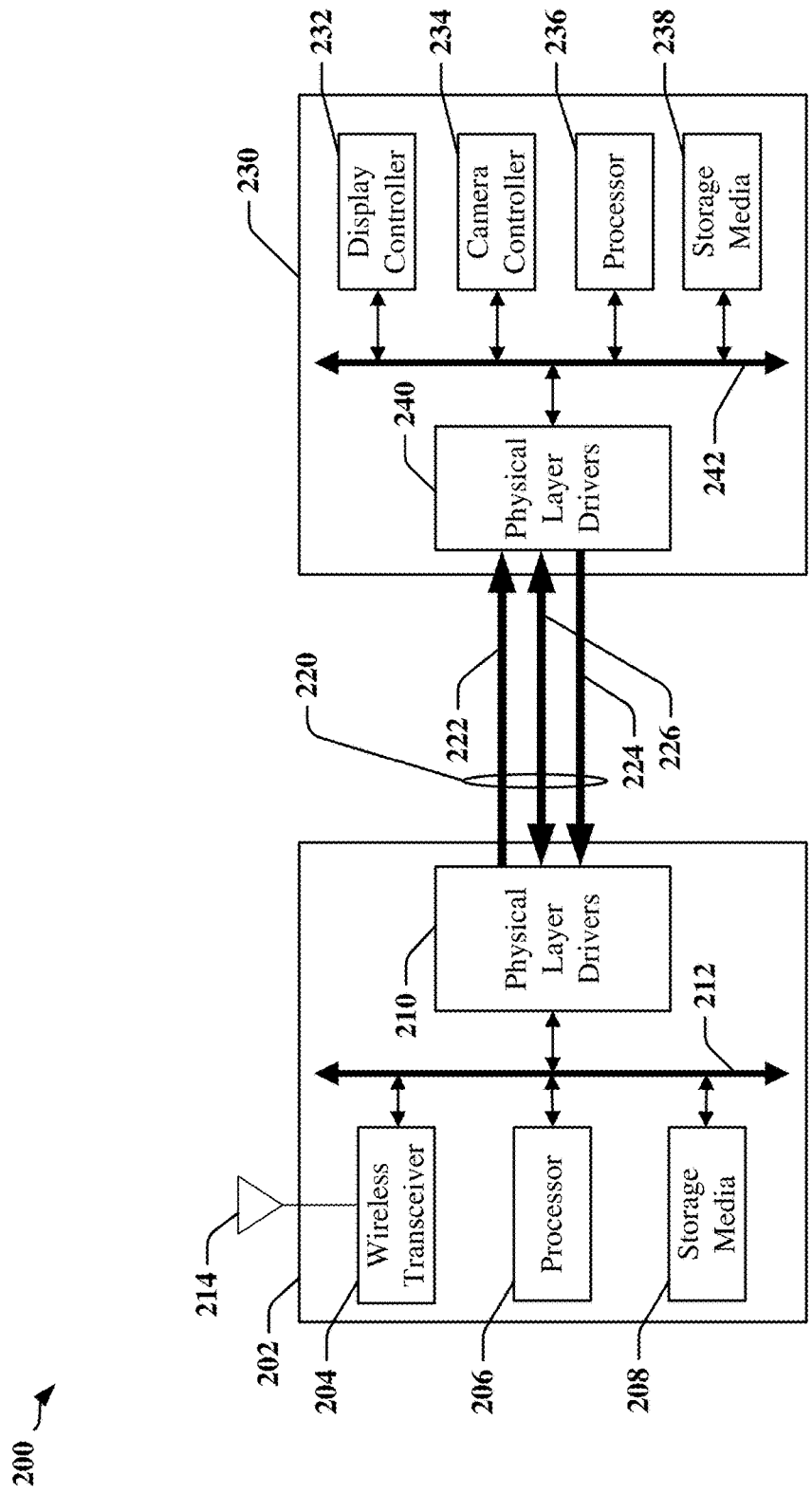
FIG. 2 illustrates a system architecture for an apparatus employing a data link between IC devices that selectively operates according to one of plurality of available standards.

FIG. 2 is a block schematic illustrating certain aspects of an apparatus 200 that includes a plurality of IC devices 202 and 230, which can exchange data and control information through a communication link 220. The communication link 220 may be used to connect a pair of IC devices 202 and 230 that are located in close proximity to one another, or that are physically located in different parts of the apparatus 200. In one example, the communication link 220 may be provided on a chip carrier, substrate or circuit board that carries the IC devices 202 and 230. In another example, a first IC device 202 may be located in a keypad section of a flip-phone while a second IC device 230 may be located in a display section of the flip-phone. In another example, a portion of the communication link 220 may include a cable or optical connection.

The communication link 220 may include multiple channels 222, 224 and 226. One or more channel 226 may be bidirectional, and may operate in half-duplex and/or full-duplex modes. One or more channel 222 and 224 may be unidirectional. The communication link 220 may be asymmetrical, providing higher bandwidth in one direction. In one example described herein, a first communications channel 222 may be referred to as a forward channel 222 while a second communications channel 224 may be referred to as a reverse channel 224. The first IC device 202 may be designated as a host system or transmitter, while the second IC device 230 may be designated as a client system or receiver, even if both IC devices 202 and 230 are configured to transmit and receive on the communications channel 222. In one example, the forward channel 222 may operate at a higher data rate when communicating data from a first IC device 202 to a second IC device 230, while the reverse channel 224 may operate at a lower data rate when communicating data from the second IC device 230 to the first IC device 202.

The IC devices 202 and 230 may each include a processor or other processing and/or computing circuit or device 206, 236. In one example, the first IC device 202 may perform core functions of the apparatus 200, including establishing and maintaining wireless communications through a wireless transceiver 204 and an antenna 214, while the second IC device 230 may support a user interface that manages or operates a display controller 232, and may control operations of a camera or video input device using a camera controller 234. Other features supported by one or more of the IC devices 202 and 230 may include a keyboard, a voice-recognition component, and other input or output devices. The display controller 232 may include circuits and software drivers that support displays such as a liquid crystal display (LCD) panel, touch-screen display, indicators, and so on. The storage media 208 and 238 may include transitory and/or non-transitory storage devices adapted to maintain instructions and data used by respective processors 206 and 236, and/or other components of the IC devices 202 and 230. Communication between each processor 206, 236 and its corresponding storage media 208 and 238 and other modules and circuits may be facilitated by one or more internal bus 212 and 242 and/or a channel 222, 224 and/or 226 of the communication link 220.

The reverse channel 224 may be operated in the same manner as the forward channel 222, and the forward channel 222, and the reverse channel 224 may be capable of transmitting at comparable speeds or at different speeds, where speed may be expressed as data transfer rate and/or clocking rates. The forward and reverse data rates may be substantially the same or differ by orders of magnitude, depending on the application. In some applications, a single bidirectional channel 226 may support communications between the first IC device 202 and the second IC device 230. The forward channel 222 and/or the reverse channel 224 may be configurable to operate in a bidirectional mode when, for example, the forward and reverse channels 222 and 224 share the same physical connections and operate in a half-duplex manner. In one example, the communication link 220 may be operated to communicate control, command and other information between the first IC device 202 and the second IC device 230 in accordance with an industry or other standard.

The communication link 220 of FIG. 2 may be implemented according to MIPI Alliance specifications for C-PHY and may provide a wired bus that includes a plurality of signal wires (denoted as M wires). The M wires may be configured to carry N-phase encoded data in a high-speed digital interface, such as a mobile display digital interface (MDDI). The M wires may facilitate N-phase polarity encoding on one or more of the channels 222, 224 and 226. The physical layer drivers 210 and 240 may be configured or adapted to generate N-phase polarity encoded data for transmission on the communication link 220. The use of N-phase polarity encoding provides high speed data transfer and may consume half or less of the power of other interfaces because fewer drivers are active in N-phase polarity encoded data links.

N-phase polarity encoding devices 210 and/or 240 can typically encode multiple bits per transition on the communication link 220. In one example, a combination of 3-phase encoding and polarity encoding may be used to support a wide video graphics array (WVGA) 80 frames per second LCD driver IC without a frame buffer, delivering pixel data at 810 Mbps for display refresh.

Figure 3:
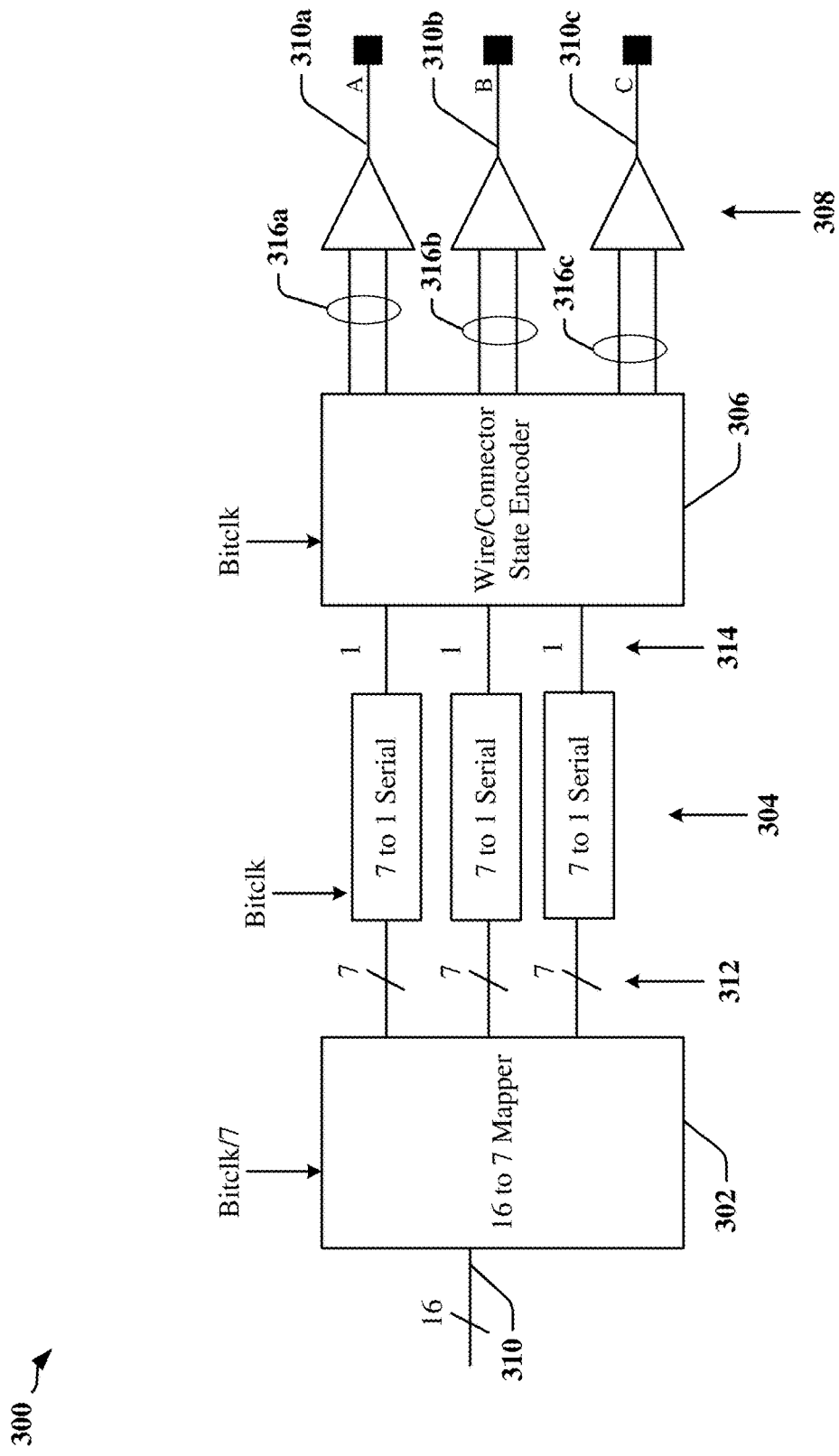
FIG. 3 illustrates a C-PHY 3-phase data encoder.

FIG. 3 is a schematic diagram 300 illustrating a 3-wire, 3-phase polarity encoder that may be used to implement certain aspects of the communication link 220 depicted in FIG. 2. The example of 3-wire, 3-phase encoding is selected solely for the purpose of simplifying descriptions of certain aspects of the invention. The principles and techniques disclosed for 3-wire, 3-phase encoders can be applied in other configurations of M-wire, N-phase polarity encoders.

Signaling states defined for each of the 3 wires in a 3-wire, 3-phase polarity encoding scheme may include an undriven state, a positively driven state and a negatively driven state. The positively driven state and the negatively driven state may be obtained by providing a voltage differential between two of the signal wires 310a, 310b and/or 310c, and/or by driving a current through two of the signal wires 310a, 310b and/or 310c connected in series such that the current flows in different directions in the two signal wires 310a, 310b and/or 310c. The undriven state may be realized by placing an output of a driver of a signal wire 310a, 310b or 310c in a high-impedance mode. Alternatively, or additionally, an undriven state may be obtained on a signal wire 310a, 310b or 310c by passively or actively causing an "undriven" signal wire 310a, 310b or 310c to attain a voltage level that lies substantially halfway between positive and negative voltage levels provided on driven signal wires 310a, 310b and/or 310c. Typically, there is no significant current flow through an undriven signal wire 310a, 310b or 310c. Signaling states defined for a 3-wire, 3-phase polarity encoding scheme may be denoted using the three voltage or current states (+1, −1, and 0).

A 3-wire, 3-phase polarity encoder may employ line drivers 308 to control the signaling state of signal wires 310a, 310b and 310c. The drivers 308 may be implemented as unit-level current-mode or voltage-mode drivers. In one example, each driver 308 may receive sets of two or more of signals 316a, 316b and 316c that determine the output state of corresponding signal wires 310a, 310b and 310c. In one example, the sets of two signals 316a, 316b and 316c may include a pull-up signal (PU signal) and a pull-down signal (PD signal) that, when high, activate pull-up and pull down circuits that drive the signal wires 310a, 310b and 310c toward a higher level or lower level voltage, respectively. In this example, when both the PU signal and the PD signal are low, the signal wires 310a, 310b and 310c may be terminated to a mid-level voltage.

For each transmitted symbol interval in an M-wire, N-phase polarity encoding scheme, at least one signal wire 310a, 310b or 310c is in the midlevel/undriven (0) voltage or current state, while the number of positively driven (+1 voltage or current state) signal wires 310a, 310b or 310c is equal to the number of negatively driven (−1 voltage or current state) signal wires 310a, 310b or 310c, such that the sum of current flowing to the receiver is always zero. For each symbol, the state of at least one signal wire 310a, 310b or 310c is changed from the symbol transmitted in the preceding transmission interval.

In operation, a mapper 302 may receive and map 16-bit data 310 to 7 symbols 312. In the 3-wire example, each of the 7 symbols defines the states of the signal wires 310a, 310b and 310c for one symbol interval. The 7 symbols 312 may be serialized using parallel-to-serial converters 304 that provide a timed sequence of symbols 314 for each signal wire 310a, 310b and 310c. The sequence of symbols 314 is typically timed using a transmission clock. A 3-wire 3-phase encoder 306 receives the sequence of 7 symbols 314 produced by the mapper one symbol at a time and computes the state of each signal wire 310a, 310b and 310c for each symbol interval. The 3-wire encoder 306 selects the states of the signal wires 310a, 310b and 310c based on the current input symbol 314 and the previous states of signal wires 310a, 310b and 310c.

The use of M-wire, N-phase encoding permits a number of bits to be encoded in a plurality of symbols where the bits per symbol is not an integer. In the example of a 3-wire communications link, there are 3 available combinations of 2 wires, which may be driven simultaneously, and 2 possible combinations of polarity on the pair of wires that is driven, yielding 6 possible states. Since each transition occurs from a current state, 5 of the 6 states are available at every transition. The state of at least one wire is required to change at each transition. With 5 states, $\log_e (5)$ 2.32 bits may be encoded per symbol. Accordingly, a mapper may accept a 16-bit word and convert it to 7 symbols because 7 symbols carrying 2.32 bits per symbol can encode 16.24 bits. In other words, a combination of seven symbols that encode five states has $5^7$ (78,125) permutations. Accordingly, the 7 symbols may be used to encode the $2^{16}$ (65,536) permutations of 16 bits.

Figure 4:
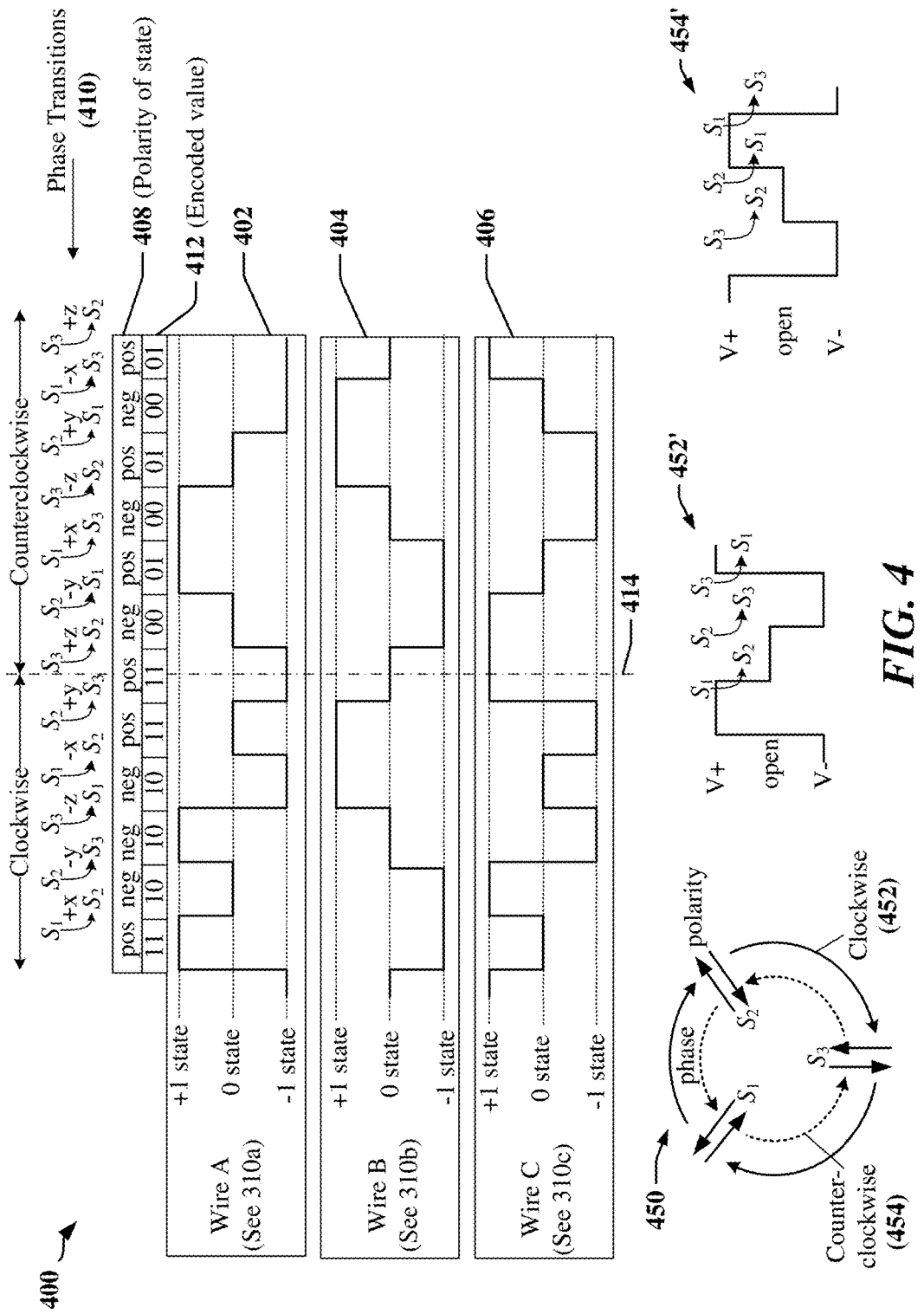
FIG. 4 illustrates signaling in a C-PHY 3-phase encoded interface.

FIG. 4 includes an example of a timing chart 400 for signals encoded using a three-phase modulation data-encoding scheme, which is based on the circular state diagram 450. Information may be encoded in a sequence of signaling states where, for example, a wire or connector is in one of three phase states $S_1$, $S_2$ and $S_3$ defined by the circular state diagram 450. Each state may be separated from the other states by a 120° phase shift. In one example, data may be encoded in the direction of rotation of phase states on the wire or connector. The phase states in a signal may rotate in clockwise direction 452 and 452' or counterclockwise direction 454 and 454'. In the clockwise direction 452 and 454' for example, the phase states may advance in a sequence that includes one or more of the transitions from $S_1$ to $S_2$, from $S_2$ to $S_3$ and from $S_3$ to $S_1$. In the counterclockwise direction 454 and 454', the phase states may advance in a sequence that includes one or more of the transitions from $S_1$ to $S_3$, from $S_3$ to $S_2$ and from $S_2$ to $S_1$. The three signal wires 310a, 310b and 310c carry different versions of the same signal, where the versions may be phase shifted by 120° with respect to one another. Each signaling state may be represented as a different voltage level on a wire or connector and/or a direction of current flow through the wire or connector. During each of the sequence of signaling states in a 3-wire system, each signal wire 310a, 310b and 310c is in a different signaling state than the other wires. When more than 3 signal wires 310a, 310b and 310c are used in a 3-phase encoding system, two or more signal wires 310a, 310b and/or 310c can be in the same signaling state at each signaling interval, although each state is present on at least one signal wire 310a, 310b and/or 310c in every signaling interval.

Information may be encoded in the direction of rotation at each phase transition 410, and the 3-phase signal may change direction for each signaling state. Direction of rotation may be determined by considering which signal wires 310a, 310b and/or 310c are in the '0' state before and after a phase transition, because the undriven signal wire 310a, 310b and/or 310c changes at every signaling state in a rotating three-phase signal, regardless of the direction of rotation.

The encoding scheme may also encode information in the polarity 408 of the two conductors 310a, 310b and/or 310c that are actively driven. At any time in a 3-wire implementation, exactly two of the conductors 310a, 310b, and 310c are driven with currents in opposite directions and/or with a voltage differential. In one implementation, data may be encoded using two bit values 412, where one bit is encoded in the direction of phase transitions 410 and the second bit is encoded in the polarity 408 for the current state.

The timing chart 400 illustrates data encoding using both phase rotation direction and polarity. The curves 402, 404 and 406 relate to signals carried on three signal wires 310a, 310b and 310c, respectively for multiple phase states. Initially, the phase transitions 410 are in a clockwise direction and the most significant bit is set to binary '1,' until the rotation of phase transitions 410 switches at a time 414 to a counterclockwise direction, as represented by a binary '0' of the most significant bit. The least significant bit reflects the polarity 408 of the signal in each state.

According to certain aspects disclosed herein, one bit of data may be encoded in the rotation, or phase change in a 3-wire, 3-phase encoding system, and an additional bit may be encoded in the polarity of the two driven wires. Additional information may be encoded in each transition of a 3-wire, 3-phase encoding system by allowing transition to any of the possible states from a current state. Given 3 rotational phases and two polarities for each phase, 6 states are available in a 3-wire, 3-phase encoding system. Accordingly, 5 states are available from any current state, and there may be $\log_2(5) \approx 2.32$ bits encoded per symbol (transition), which allows the mapper 302 to accept a 16-bit word and encode it in 7 symbols.

N-Phase data transfer may use more than three wires provided in a communication medium, such as a bus. The use of additional signal wires that can be driven simultaneously provides more combinations of states and polarities and allows more bits of data to be encoded at each transition between states. This can significantly improve throughput of the system, and reduce the power consumption over approaches that use multiple differential pairs to transmit data bits, while providing increased bandwidth.

In one example, an encoder may transmit symbols using 6 wires with 2 pairs of wires driven for each state. The 6 wires may be labeled A through F, such that in one state, wires A and F are driven positive, wires B and E negative, and C and D are undriven (or carry no current). For six wires, there may be:

$$C(6, 4) = \frac{6!}{(6-4)! \cdot 4!} = 15$$

possible combinations of actively driven wires, with:

$$C(4, 2) = \frac{4!}{(4-2)! \cdot 2!} = 6$$

different combinations of polarity for each phase state.

The 15 different combinations of actively driven wires may include:

| ABCD | ABCE | ABCF | ABDE | ABDF |
| ABEF | ACDE | ACDF | ACEF | ADEF |
| BCDE | BCDF | BCEF | BDEF | CDEF |

Of the 4 wires driven, the possible combinations of two wires driven positive (and the other two must be negative). The combinations of polarity may include:
++-- +--+ +-+- -+-+ --++

Accordingly, the total number of different states may be calculated as 15×6=90. To guarantee a transition between symbols, 89 states are available from any current state, and the number of bits that may be encoded in each symbol may be calculated as: $\log_2(89) \approx 6.47$ bits per symbol. In this example, a 32-bit word can be encoded by the mapper into 5 symbols, given that 5×6.47=32.35 bits.

The general equation for the number of combinations of wires that can be driven for a bus of any size, as a function of the number of wires in the bus and number of wires simultaneously driven:

$$C(N_{wires}, N_{driven}) = \frac{N_{wires}!}{(N_{wires} - N_{driven})! \cdot N_{driven}!}$$

one equation for calculating the number of combinations of polarity for the wires being driven is:

$$C\left(N_{driven}, \frac{N_{driven}}{2}\right) = \frac{N_{driven}!}{\left(\left(\frac{N_{driven}}{2}\right)!\right)^2}$$

The equivalent number of bits per symbol may be stated as:

$$\log_2\left(C(N_{wires}, N_{driven}) \cdot C\left(N_{driven}, \frac{N_{driven}}{2}\right) - 1\right)$$

Figure 5:
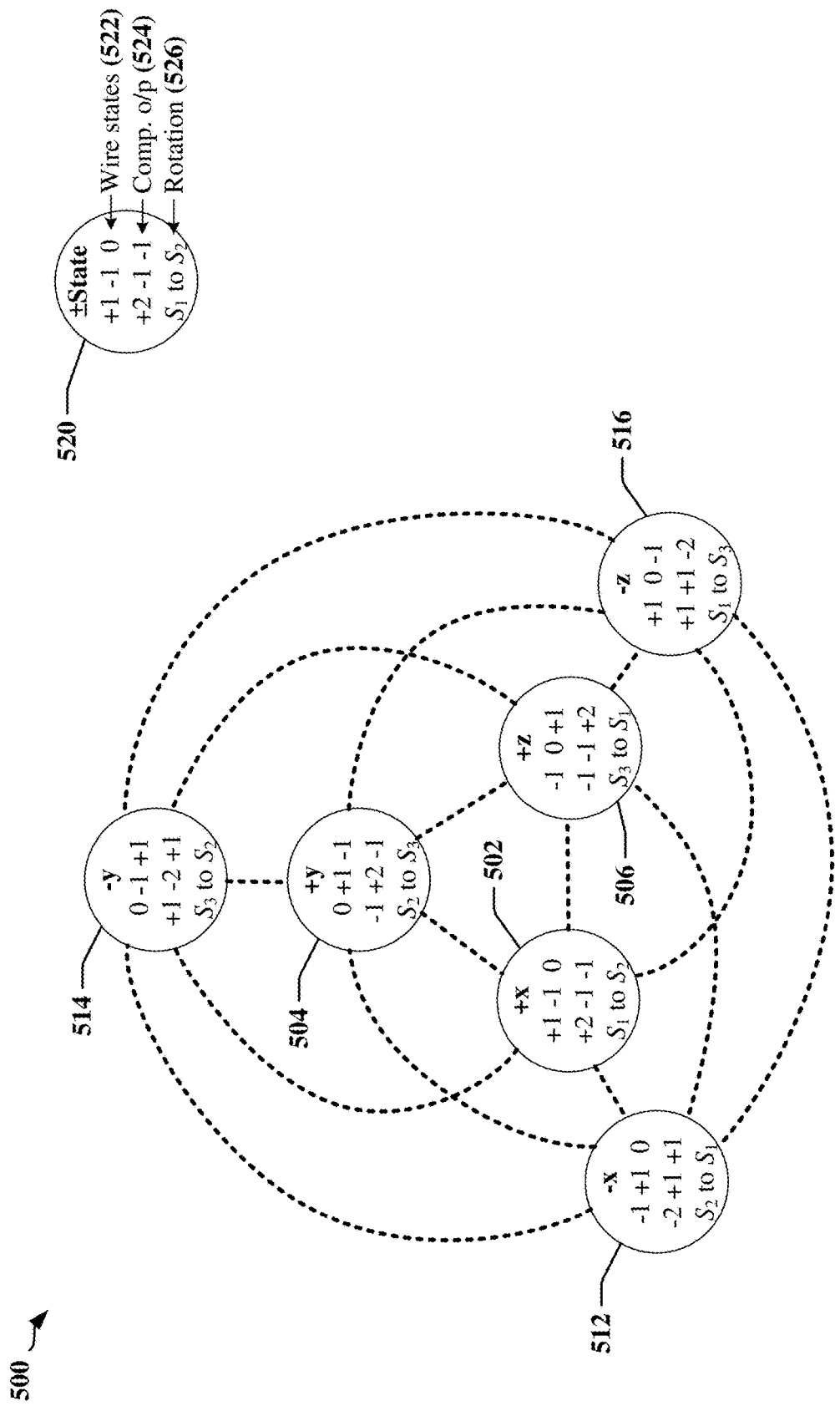
FIG. 5 is a state diagram illustrating potential state transitions in a C-PHY 3-phase encoded interface.

FIG. 5 is a state diagram 500 illustrating 6 states and 30 possible state transitions in one example of a 3-wire, 3-phase communication link. The possible states 502, 504, 506, 512, 514 and 516 in the state diagram 500 include and expand on the states shown in the circular state diagram 450 of FIG. 4. As shown in the exemplar of a state element 520, each state 502, 504, 506, 512, 514 and 516 in the state diagram 500 includes a field 522 showing the voltage state of signals A, B and C (transmitted on signal wires 310a, 310b and 310c respectively), a field 524 showing the result of a subtraction of wire voltages by differential receivers (see the differential amplifiers/receivers 602 of FIG. 6, for example), respectively and a field 526 indicating the direction of rotation. For example, in state 502 (+x) wire A=+1, wire B=−1 and wire C=0, yielding output of differential receiver 702*a* (A-B)=+2, differential receiver 702*b* (B-C)=−1 and differential receiver 702*c* (C-A)=+1. As illustrated by the state diagram, transition decisions taken by phase change detect circuitry in a receiver are based on 5 possible levels produced by differential receivers, which include −2, −1, 0, +1 and +2 voltage states.

Figure 6:
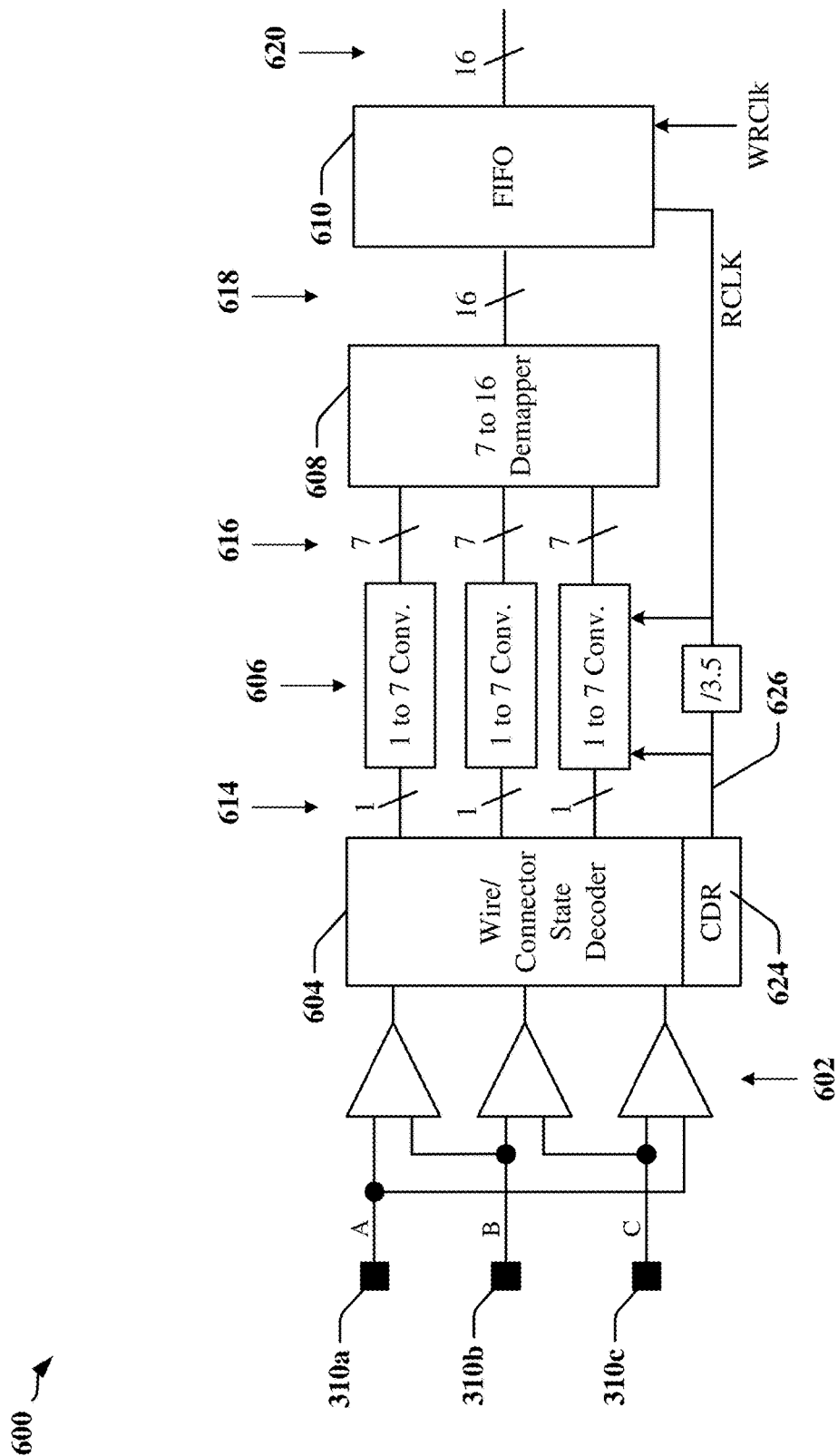
FIG. 6 illustrates a C-PHY 3-phase decoder.

FIG. 6 is a diagram illustrating certain aspects of a 3-wire, 3-phase decoder 600. Differential receivers 602 and a wire state decoder 604 are configured to provide a digital representation of the state of the three transmission lines (e.g., the signal wires 310*a*, 310*b* and 310*c* illustrated in FIG. 3), with respect to one another, and to detect changes in the state of the three transmission lines compared to the state transmitted in the previous symbol period. Seven consecutive states are assembled by the serial-to-parallel convertors 606 to obtain a set of 7 symbols to be processed by the demapper 608. The demapper 608 produces 16 bits of data that may be buffered in a first-in-first-out (FIFO) register 610.

The wire state decoder 604 may extract a sequence of symbols 614 from phase encoded signals received on the signal wires 310*a*, 310*b* and 310*c*. The symbols 614 are encoded as a combination of phase rotation and polarity as disclosed herein. The wire state decoder may include a CDR circuit 624 that extracts a recovered clock 626 (RCLK) that can be used to reliably capture symbols from the signal wires 310*a*, 310*b* and 310*c*. A transition occurs on least one of the signal wires 310*a*, 310*b* and 310*c* at each symbol boundary and the CDR circuit 624 may be configured to generate the clock 626 based on the occurrence of a transition or multiple transitions. An edge of the clock may be delayed to allow time for all signal wires 310*a*, 310*b* and 310*c* to have stabilized and to thereby ensure that the current symbol is captured for decoding purposes.

A 3-phase transmitter includes drivers that provide high, low and middle-level voltages onto the transmit channel. This results in some variable transitions between consecutive symbol intervals. Low-to-high and high-to-low voltage transitions may be referred to as full-swing transitions, while low-to-middle and high-to-middle voltage transitions may be referred to as half-swing transitions. Different types of transitions may have different rise or fall times, and may result in different zero crossings at the receiver. These differences can result in "encoding jitter," which may impact link signal integrity performance.

Figure 7:
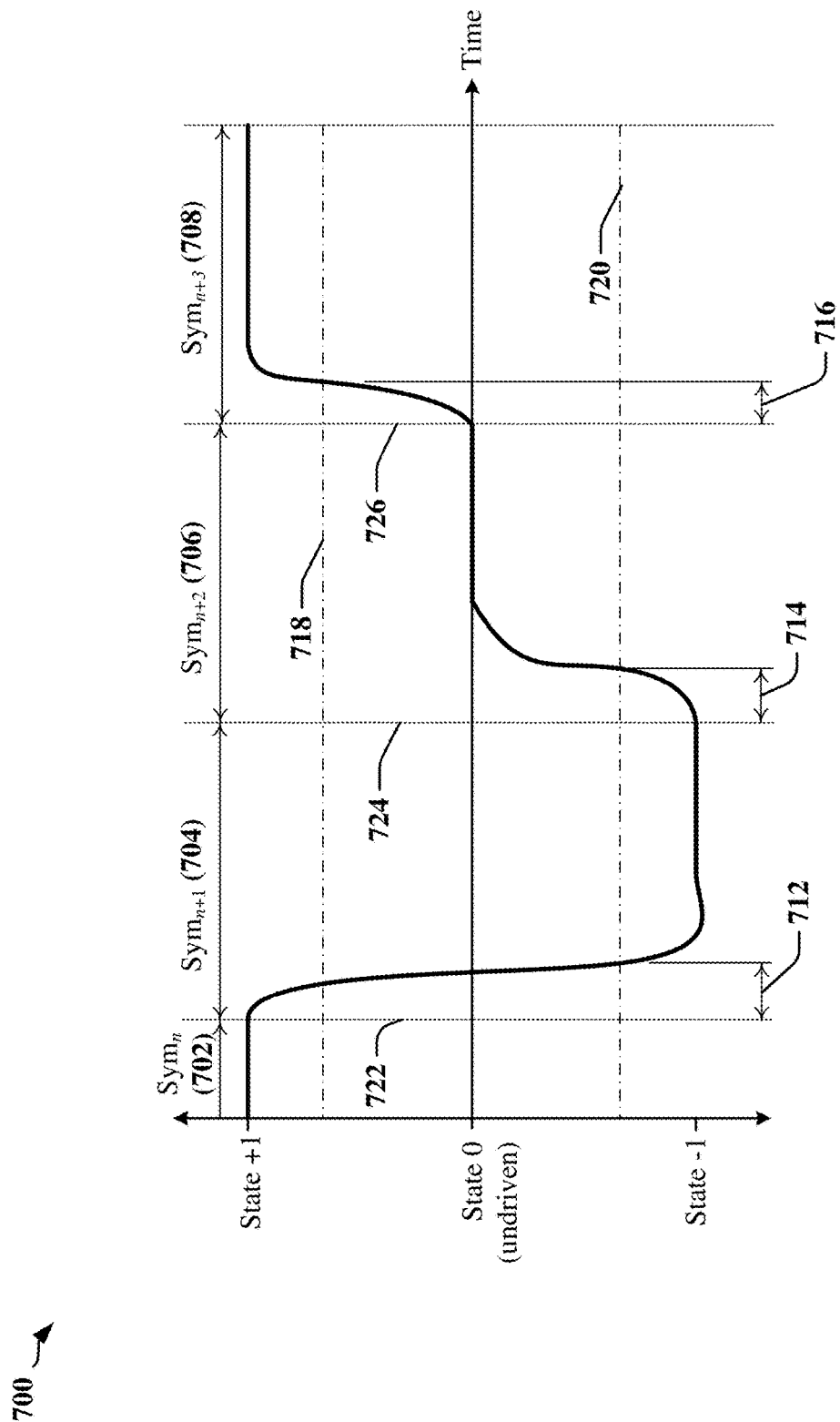
FIG. 7 is an example of the effects of signal rise times on transition detection in a C-PHY decoder.

FIG. 7 is an exemplary timing diagram 700 that illustrates certain aspects of transition variability at the output of a C-PHY 3-phase transmitter. Variability in signal transition times may be attributed to the existence of the different voltage and/or current levels used in 3-phase signaling. The timing diagram 700 illustrates transition times in a signal received from a single signal wire 310*a*, 310*b* or 310*c*. A first symbol $Sym_n$ 702 is transmitted in a first symbol interval that ends at a time 722 when a second symbol $Sym_{n+1}$ 724 is transmitted in a second symbol interval. The second symbol interval may end at time 726 when a third symbol $Sym_{n+2}$ 706 is transmitted in the third symbol interval, which ends when a fourth symbol $Sym_{n+3}$ 708 is transmitted in a fourth symbol interval. The transition from a state determined by the first symbol 702 to the state corresponding to the second symbol 704 may be detectable after a delay 712 attributable to the time taken for voltage in the signal wire 310*a*, 310*b* or 310*c* to reach a threshold voltage 718 and/or 720. The threshold voltages may be used to determine the state of the signal wire 310*a*, 310*b* or 310*c*. The transition from a state determined by the second symbol 704 to the state for the third symbol 706 may be detectable after a delay 714 attributable to the time taken for voltage in the signal wire 310*a*, 310*b* or 310*c* to reach one of the threshold voltages 718 and/or 720. The transition from a state determined by the third symbol 706 to the state for the fourth symbol 708 may be detectable after a delay 716 attributable to the time taken for voltage in the signal wire 310*a*, 310*b* or 310*c* to reach a threshold voltage 718 and/or 720. The delays 712, 714 and 716 may have different durations, which may be attributable in part to variations in device manufacturing processes and operational conditions, which may produce unequal effects on transitions between different voltage or current levels associated with the 3 states and/or different transition magnitudes. These differences may contribute to jitter and other issues in C-PHY 3-phase receiver.

Figure 8:
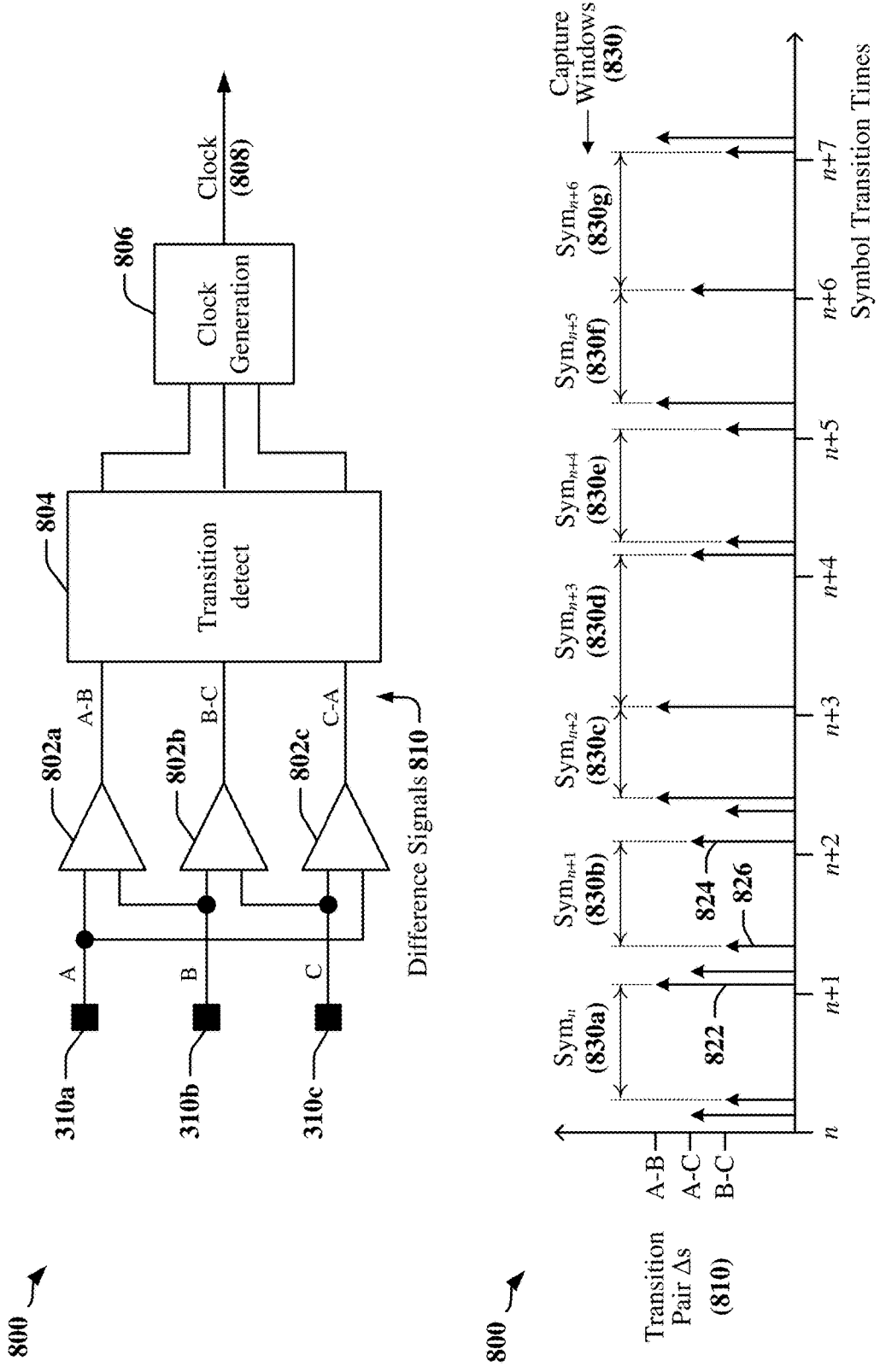
FIG. 8 illustrates transition detection in a C-PHY decoder.

FIG. 8 includes a block schematic 800 illustrating certain aspects of CDR circuits that may be provided in a receiver in a C-PHY 3-phase interface. A set of differential receivers 802*a*, 802*b* and 802*c* is configured to generate a set of difference signals 810 by comparing each of the three signal wires 310*a*, 310*b* and 310*c* in a trio with the other of the three signal wires 310*a*, 310*b* and 310*c* in the trio. In the example depicted, a first differential receiver 802*a* compares the states of signal wires 310*a* and 310*b*, a second differential receiver 802*b* compares the states of signal wires 310*b* and 310*c* and a third differential receiver 802*c* compares the states of signal wires 310*a* and 310*c*. Accordingly, a transition detection circuit 804 can be configured to detect occurrence of a phase change because the output of at least one of the differential receivers 802*a*, 802*b* and 802*c* changes at the end of each symbol interval.

Certain transitions between transmitted symbols may be detectable by a single differential receiver 802*a*, 802*b* or 802*c*, while other transitions may be detected by two or more of the differential receivers 802*a*, 802*b* and 802*c*. In one example the states, or relative states of two wires may be unchanged after a transition and the output of a corresponding differential receiver 802*a*, 802*b* or 802*c* may also be unchanged after the phase transition. In another example, both wires in a pair of signal wires 310*a*, 310*b* and/or 310*c* may be in the same state in a first time interval and both wires may be in a same second state in a second time interval and the corresponding differential receiver 802*a*, 802*b* or 802*c* may be unchanged after the phase transition. Accordingly, a clock generation circuit 806 may include a transition detection circuit 804 and/or other logic to monitor the outputs of all differential receivers 802*a*, 802*b* and 802*c* in order to determine when a phase transition has occurred. The clock generation circuit may generate a receive clock signal 808 based on detected phase transitions.

Changes in signaling states of the 3 wires may be detected at different times for different combinations of the signal wires 310*a*, 310*b* and/or 310*c*. The timing of detection of signaling state changes may vary according to the type of signaling state change that has occurred. The result of such variability is illustrated in the timing chart 850 of FIG. 8. Markers 822, 824 and 826 represent occurrences of transitions in the difference signals 810 provided to the transition detection circuit 804. The markers 822, 824 and 826 are assigned different heights in the timing chart 850 for clarity of illustration only, and the relative heights of the markers 822, 824 and 826 are not intended to show a specific relationship to voltage or current levels, polarity or weighting values used for clock generation or data decoding. The timing chart 850 illustrates the effect of timing of transitions associated with symbols transmitted in phase and polarity on the three signal wires 310a, 310b and 310c. In the timing chart 850, transitions between some symbols may result in variable capture windows 830a, 830b, 830c, 830d, 830e, 830f and/or 830g (collectively symbol capture windows 830) during which symbols may be reliably captured. The number of state changes detected and their relative timing can result in jitter on the clock signal 808.

The throughput of a C-PHY communications link may be affected by duration and variability in signal transition times. For example, variability in detection circuits may be caused by manufacturing process tolerances, variations and stability of voltage and current sources and operating temperature, as well as by the electrical characteristics of the signal wires 310a, 310b and 310c. The variability in detection circuits may limit channel bandwidth.

Figure 9:
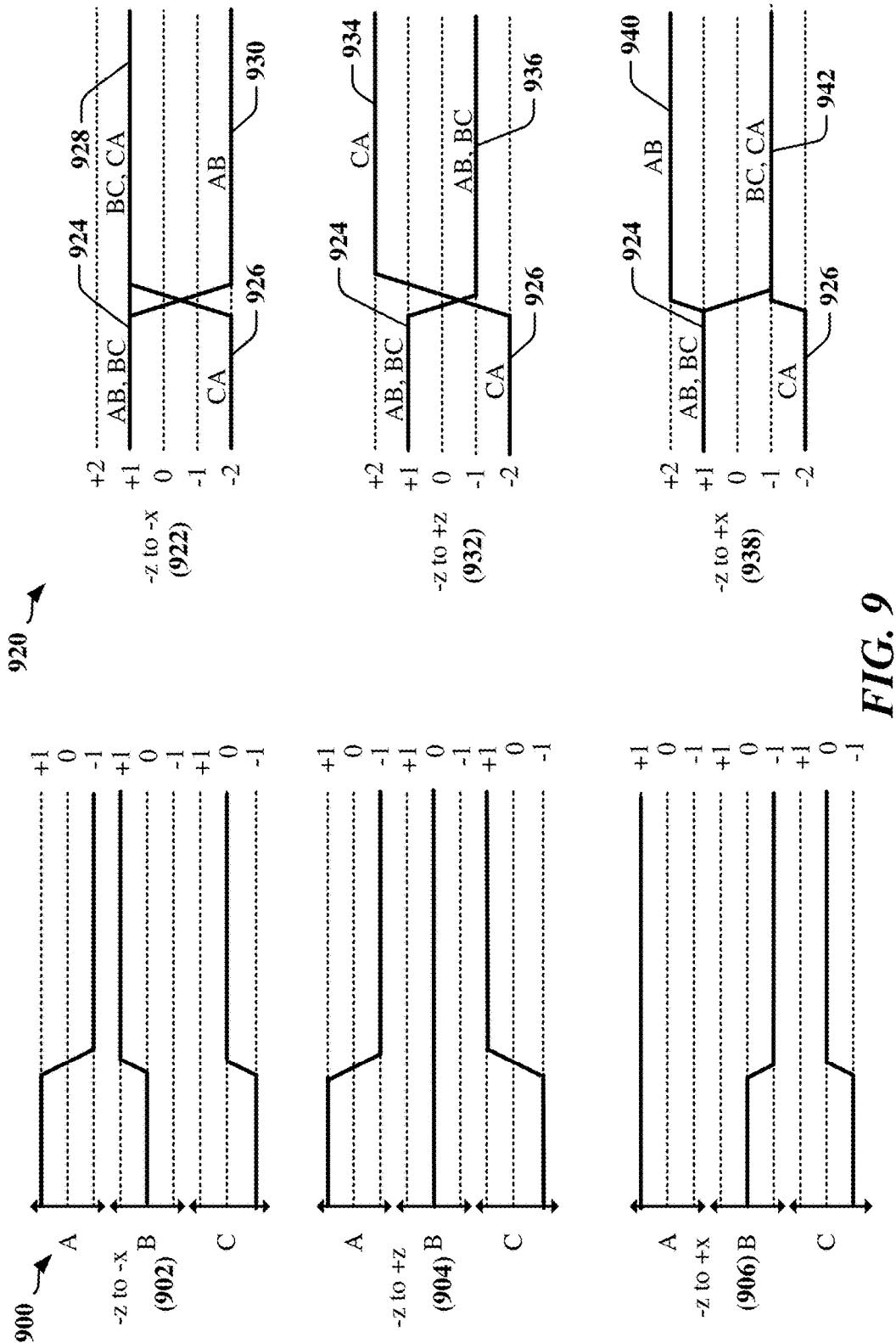
FIG. 9 illustrates one example of signal transitions occurring between pairs of consecutive symbols transmitted on a C-PHY interface.

FIG. 9 includes timing charts 900 and 920 representative of certain examples of transitions from a first signaling state to a second signaling state between certain consecutive symbols. The signaling state transitions illustrated in the timing charts 900 and 920 are selected for illustrative purposes, and other transitions and combinations of transitions can occur in a C-PHY interface. The timing charts 900 and 920 relate to an example of a 3-wire, 3-phase communications link, in which multiple receiver output transitions may occur at each symbol interval boundary due to differences in rise and fall time between the signal levels on the trio of wires. With reference also to FIG. 8, the first timing charts 900 illustrate the signaling states of the trio of signal wires 310a, 310b and 310c (A, B, and C) before and after a transition and second timing charts 920 illustrate the outputs of the differential receivers 802a, 802b and 802c, which provides difference signals 810 representative of the differences between signal wires 310a, 310b and 310c. In many instances, a set of differential receivers 802a, 802b and 802c may be configured to capture transitions by comparing different combinations for two signal wires 310a, 310b and 310c. In one example, these differential receivers 802a, 802b and 802c may be configured to produce outputs by determining the difference (e.g. by subtraction) of their respective input voltages.

In each of the examples shown in the timing charts 900 and 920, the initial symbol (−z) 516 (see FIG. 8) transitions to a different symbol. As shown in the timing charts 902, 904 and 906 signal A is initially in a +1 state, signal B is in a 0 state and signal C is in the −1 state. Accordingly, the differential receivers 802a, 802b initially measure a +1 difference 924 and the differential receiver 802c measures a −2 difference 926, as shown in the timing charts 922, 932, 938 for the differential receiver outputs.

In a first example corresponding to the timing charts 902, 922, a transition occurs from symbol (−z) 516 to symbol (−x) 512 (see FIG. 8) in which signal A transitions to a −1 state, signal B transitions to a +1 state and signal C transitions to a 0 state, with the differential receiver 802a transitioning from +1 difference 924 to a −2 difference 930, differential receiver 802b remaining at a +1 difference 924, 928 and differential receiver 802c transitioning from −2 difference 926 to a +1 difference 928.

In a second example corresponding to the timing charts 904, 932, a transition occurs from symbol (−z) 516 to symbol (+z) 506 in which signal A transitions to a −1 state, signal B remains at the 0 state and signal C transitions to a +1 state, with two differential receivers 802a and 802b transitioning from +1 difference 924 to a −1 difference 936, and differential receiver 802c transitioning from −2 difference 926 to a +2 difference 934.

In a third example corresponding to the timing charts 906, 938, a transition occurs from symbol (−z) 516 to symbol (+x) 502 in which signal A remains at the +1 state, signal B transitions to the −1 state and signal C transitions to a 0 state, with the differential receiver 802a transitioning from a +1 difference 924 to a +2 difference 940, the differential receiver 802b transitioning from a +1 difference 924 to a −1 difference 942, and the differential receiver 802c transitioning from −2 difference 926 to a −1 difference 942.

These examples illustrate transitions in difference values spanning 0, 1, 2, 3, 4 and 5 levels. Pre-emphasis techniques used for typical differential or single-ended serial transmitters were developed for two level transitions and may introduce certain adverse effects if used on a MIPI Alliance C-PHY 3-phase signal. In particular, a pre-emphasis circuit that overdrives a signal during transitions may cause overshoot during transitions spanning 1 or 2 levels and may cause false triggers to occur in edge sensitive circuits.

Figure 10:
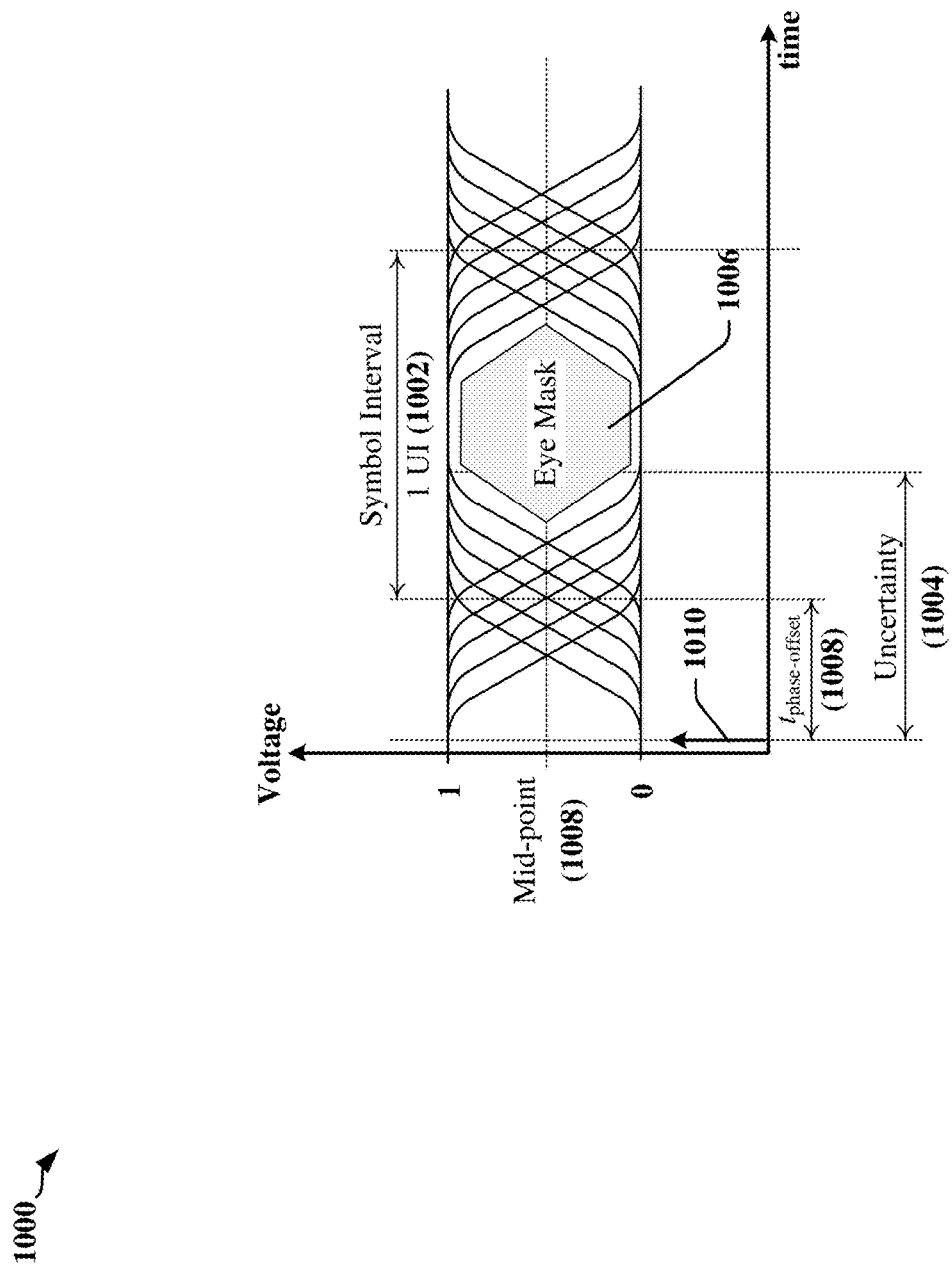
FIG. 10 illustrates transition regions and eye regions in an eye-pattern.

FIG. 10 illustrates an eye pattern 1000 generated as an overlay of multiple symbol intervals, including a single symbol interval 1002. A signal transition region 1004 represents a time period of uncertainty at the boundary between two symbols where variable signal rise times prevent reliable decoding. State information may be determined reliably in a region defined by an eye mask 1006 within an "eye opening" that represents the time period in which the symbol is stable and can be reliably received and decoded. The eye mask 1006 masks off a region in which zero crossings do not occur, and the eye mask is used by the decoder to prevent multiple clocking due to the effect of subsequent zero crossings at the symbol interval boundary that follow the first signal zero crossing.

The concept of periodic sampling and display of the signal is useful during design, adaptation and configuration of systems which use a clock-data recovery circuit that re-creates the received data-timing signal using frequent transitions appearing in the received data. A communication system based on Serializer/Deserializer (SERDES) technology is an example of a system where an eye pattern 1000 can be utilized as a basis for judging the ability to reliably recover data based on the eye opening of the eye pattern 1000.

An M-wire N-Phase encoding system, such as a 3-wire, 3-phase encoder may encode a signal that has at least one transition at every symbol boundary and the receiver may recover a clock using those guaranteed transitions. The receiver may require reliable data immediately prior to the first signal transition at a symbol boundary, and must also be able to reliably mask any occurrences of multiple transitions that are correlated to the same symbol boundary. Multiple receiver transitions may occur due to slight differences in rise and fall time between the signals carried on the M-wires (e.g. a trio of wires) and due to slight differences in signal propagation times between the combinations of signal pairs received (e.g. A-B, B-C, and C-A outputs of differential receivers 802a, 802b and 802c of FIG. 6).

Figure 11:
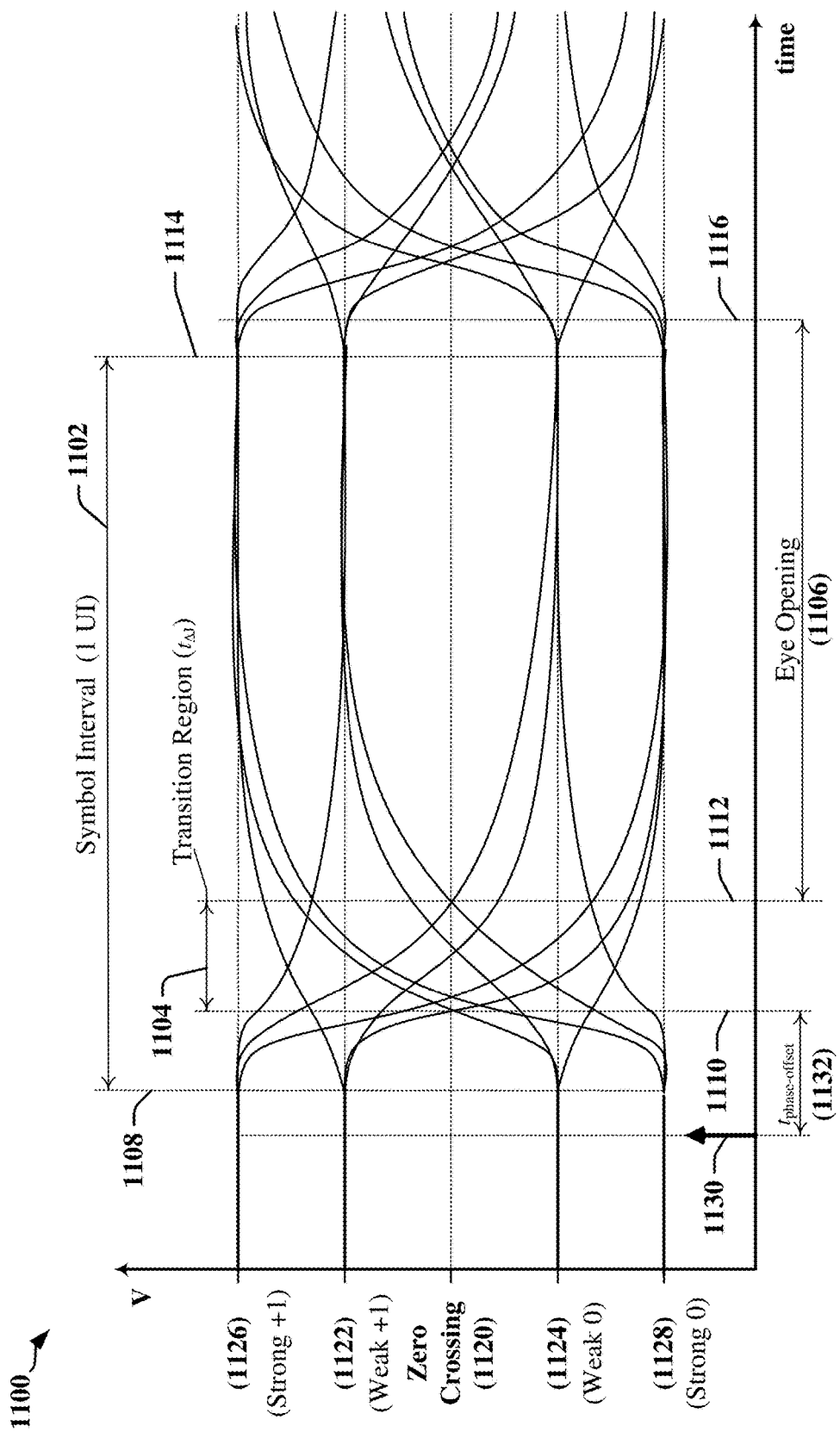
FIG. 11 illustrates an example of an eye-pattern generated for a C-PHY 3-Phase interface.

FIG. 11 illustrates an example of an eye-pattern 1100 generated for a C-PHY 3-phase signal. The eye-pattern 1100 may be generated from an overlay of multiple symbol intervals 1102. The eye-pattern 1100 may be produced using a fixed and/or symbol-independent trigger 1130. The eye-pattern 1100 includes an increased number of voltage levels 1120, 1122, 1124, 1126, 1128 that may be attributed to the multiple voltage levels measured by the differential receivers 802a, 802b, 802c an N-phase receiver circuit (see FIG. 8). In the example, the eye-pattern 1100 may correspond to possible transitions in 3-wire, 3-phase encoded signals provided to the differential receivers 802a, 802b, and 802c. The three voltage levels may cause the differential receivers 802a, 802b, and 802c to generate strong voltage levels 1126, 1128 and weak voltage levels 1122, 1124 for both positive and negative polarities. Typically, only one signal wire 310a, 310b and 310c is undriven in any symbol and the differential receivers 802a, 802b, and 802c do not produce a 0 state output. The voltages associated with strong and weak levels need not be evenly spaced with respect to a zero crossing level. For example, the weak voltage levels 1122, 1124 represent a comparison of voltages that may include the voltage level reached by an undriven signal wire 310a, 310b and 310c. The eye-pattern 1100 may overlap the waveforms produced by the differential receivers 802a, 802b, and 802c because all three pairs of signals are considered simultaneously when data is captured at the receiving device. The waveforms produced by the differential receivers 802a, 802b, and 802c are representative of difference signals 810 representing comparisons of three pairs of signals (A-B, B-C, and C-A). The eye pattern shown has four received signal levels that are the result of three transmitted single-ended levels (e.g., ¼ V, ½ V, ¾ V) of the driver circuit in the C-PHY transmitter. Combinations of the three single-ended levels from the drivers on the three signals will cause strong and weak 1s and 0s to appear across the three differential receiver inputs (3 ways to receive 2 signals at a time out of a total of 3 signals). Only the center of the eye between the weak 0 and weak 1 are considered by a receiver. The eye pattern is thus generated or drawn by overlapping the three waveforms of all three pairs of signals, which are: A minus B, B minus C, and C minus A. The eye pattern is drawn in this manner because all three pairs of signals are used simultaneously when the clock is recovered and data is captured at the C-PHY receiver.

Drivers, receivers and other devices used in a C-PHY 3-Phase decoder may exhibit different switching characteristics that can introduce relative delays between signals received from the three wires. Multiple receiver output transitions may be observed at each symbol interval boundary 1108 and/or 1114 due to slight differences in the rise and fall time between the three signals of the trio of signal wires 310a, 310b, 310c and due to slight differences in signal propagation times between the combinations of pairs of signals received from the signal wires 310a, 310b, 310c. The eye-pattern 1100 may capture variances in rise and fall times as a relative delay in transitions near each symbol interval boundary 1108 and 1114. The variances in rise and fall times may be due to the different characteristics of the 3-Phase drivers. Differences in rise and fall times may also result in an effective shortening or lengthening of the duration of the symbol interval 1102 for any given symbol.

A signal transition region 1104 represents a time, or period of uncertainty, where variable signal rise times prevent reliable decoding. State information may be reliably determined in an "eye opening" 1106 representing the time period in which the symbol is stable and can be reliably received and decoded. In one example, the eye opening 1106 may be determined to begin at the end 1112 of the signal transition region 1104, and end at the symbol interval boundary 1114 of the symbol interval 1102. In the example depicted in FIG. 11, the eye opening 1106 may be determined to begin at the end 1112 of the signal transition region 1104, and end at a time 1116 when the signaling state of the signal wires 310a, 310b, 310c and/or the outputs of the three differential receivers 802a, 802b and 802c have begun to change to reflect the next symbol.

The maximum speed of a communication link 220 configured for N-Phase encoding may be limited by the duration of the signal transition region 1104 compared to the eye opening 1106 corresponding to the received signal. The minimum period for the symbol interval 1102 may be constrained by tightened design margins associated with the CDR circuit 624 in the decoder 600 illustrated in FIG. 6, for example. Different signaling state transitions may be associated with different variations in signal transition times corresponding to two or more signal wires 310a, 310b and/or 310c, thereby causing the outputs of the differential receivers 802a, 802b and 802c in the receiving device to change at different times and/or rates with respect to the symbol interval boundary 1108, where the inputs of the differential receivers 802a, 802b and 802c begin to change. The differences between signal transition times may result in timing skews between signaling transitions in two or more difference signals 810. CDR circuits may include delay elements and other circuits to accommodate timing skews between the difference signals 810.

Eye Monitoring and Skew Measurement

As mentioned before, the increases in speed for MIPI C-PHY protocols, in particular, have made monitoring of the eye pattern or characteristics at a receiver, such as receivers 600 or 800, more important. The monitoring of the eye pattern as experienced by the receiver may be used to plot an eye diagram that is helpful for characterizing the incoming signal and the signal's integrity. This information may, in turn, be used for debugging receiver circuitry or board design problems, as examples. Additionally, it may be further beneficial to measure the timing skew between the three wires A, B, and C as experienced at the receiver to characterize the incoming signal with more accuracy.

Figure 12:
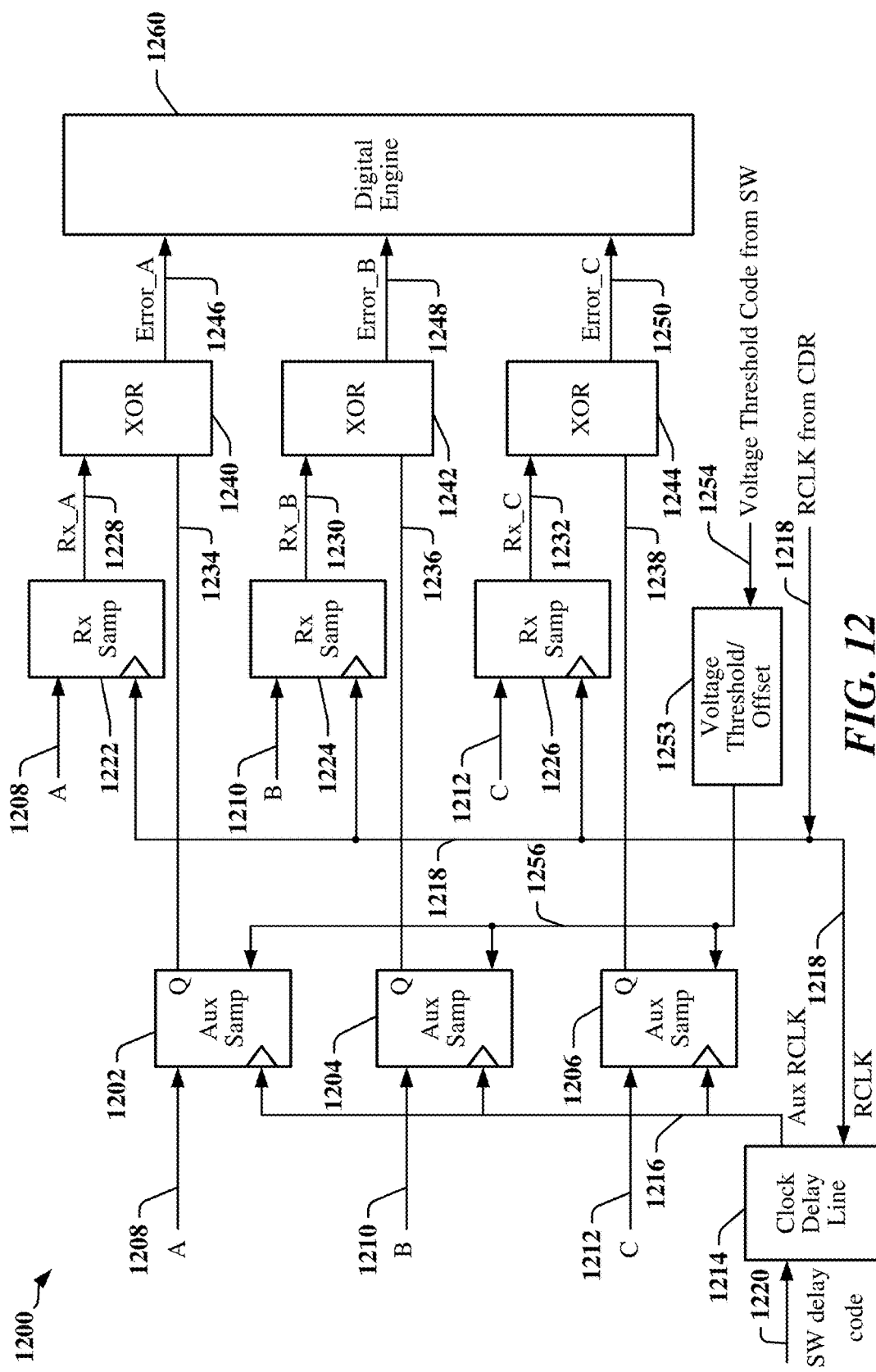
FIG. 12 illustrates an example of an exemplary circuitry for measuring voltage and time based error values in a receiver according to aspects of the present disclosure.

FIG. 12 illustrates an exemplary circuit diagram 1200 of an apparatus at a receiver device for implementing improved eye monitoring and skew measurement according to aspects of the present disclosure. The circuit 1200 implements eye monitoring using auxiliary sampling that is offset in time from the signals on the A, B, and C wires in order to create comparison or error signals based on the comparison there between that can be used to plot an eye diagram. To this end, the circuit 1200 includes auxiliary samplers 1202, 1204, and 1206 that respectively receive inputs from the A, B, C wires 1208, 1210, and 1212. The auxiliary samplers 1202, 1204, and 1206 may implemented with D Flip flops, or any other suitable circuitry configured to hold an input value at its output (e.g., a Q output in the case of a D flip flop) for a clocked period of time.

The samplers 1202, 1204, and 1206 are clocked with an auxiliary recovered clock signal (Aux_RCLK) 1216 generated by a clock delay line or circuit 1214, which is configured to delay a recovered clock signal (RCLK) 1218 by various predetermined or programmable delay times (See e.g., delay code 1220 received from a processor implementing code or software that determines the delay time, although the present disclosure is not limited to such and in other embodiment the circuitry 1214 may include logic configured to set various delay times). In an aspect, the circuit 1214 may effectuate an N number of clock delay steps over a number of unit interval (UIs) or similar time periods. In one example, the N number of steps may be 64 different time delay steps over which the circuitry 1214 sweeps the clock delay. It is further noted that the RCLK signal 1218 is received from CDR circuitry within the receiver, such as CDR 624 or 806 as discussed earlier. The outputs of the auxiliary samplers 1202, 1204, and 1206 are thus clocked with a clock 1216 that is delayed from the CDR RCLK 1218, resulting in the output of sampled signals of the A, B, and C wires that are delayed from the signals on the A, B, and C wires by the predetermined or programmed time delay.

In addition to the auxiliary samplers 1202, 1204, and 1206, the circuitry 1200 includes normal functional path samplers 1222, 1224, and 1226 in the receiver, which respectively sample the A, B, and C wire signals 1208, 1210, and 1212 according to the time clocked by the CDR RCLK signal 1218. It will be appreciated by those skilled in the art that the output sampled signals Rx_A, Rx_B, and Rx_C (1228, 1230, 1232) from samplers 1222, 1224, and 1226 will ahead of the delayed sampled signals 1234, 1236, and 1238 from auxiliary samplers 1202, 1204, and 1206. Pairs of the sampled signals and delayed signals corresponding to the A, B, and C wires (i.e., signals 1228 and 1234, signals 1230 and 1236, and signals 1232 and 1238) are input to comparators 1240, 1242, and 1244, which compare the signals to obtain error signals or states 1246, 1248, and 1250 for each line (i.e., Error_A, Error_B, and Error_C) when the voltage of one sampled signal is less than the corresponding delayed sampled signal during a sampled time step. Thus, during a time of transitions of the signals on the A, B, or C wires, such as during time of the transition Region ($t_{A,r}$) discussed earlier, differences will likely exist between at least some of the samples 1228, 1230, 1232 and the delayed samples 1234, 1236, and 1238 as signal voltage changes will be occurring between the sampled time and the delayed sampled time. In an aspect, the comparators 1240, 1242, and 1244 may be implemented using XOR logic gates as illustrated in FIG. 12, but the present disclosure is not necessarily limited to such. In the example of XOR logic, when a difference is present between the samples 1228, 1230, 1232 and the delayed samples 1234, 1236, and 1238, the output of the comparators 1240, 1242, and 1244 using XOR logic will be a logic "HIGH" or "1", whereas if there is no difference (or little difference according to some predetermined threshold) in the levels of the signals, the output of the XOR logic will be "LOW" or "0". In this example, logic "1" will then indicate the likelihood of error and, thus, a time period where the eye pattern would be not be indicated, whereas logic "0" will indicate the likelihood of less or no error (i.e., a steady state of the signals), which would, in turn, indicate the appropriateness of the eye pattern being mapped in this time period.

Additionally, the apparatus 1200 includes a voltage threshold circuitry 1252 that is configured to set a voltage offset or threshold for the auxiliary samplers 1202, 1204, 1206. In an aspect, the voltage threshold circuitry 1252 may be programmable and configured to receive a voltage threshold code from a processor running an algorithm or software that is used to set the voltage threshold, although the present disclosure is not limited to such and in other embodiments the circuitry 1252 may include logic configured to set various voltage thresholds. In an example, the voltage threshold circuitry may input an "M" number of voltage offset values that the threshold circuitry 1252 will sweep the voltage to be able to measure the characteristics of the incoming signals on lines A, B, and/or C. The voltage threshold or offset signal 1256 is provided to the auxiliary samplers 1202, 1204, 1206, which may be configured to output the input value dependent upon whether the voltage input to the sampler is above or below the threshold to determine the value of the input signal. For example, if the input signal voltage is higher than threshold, then the value is captured as 1. If the input signal voltage is less than threshold, the value is captured as 0. If the input signal is equal to threshold (within noise range) then value may be randomly either 0 or 1.

As further illustrated in FIG. 12, the error signals 1246, 1248, and 1250 are input to a digital engine 1260 or similar circuitry to accumulate the error signals over time; e.g., an error signal array generator. In one example, the accumulated error signals may be over the "N" number of time steps, which may be N delay time steps or samples over a number of unit intervals (UIs) or equivalent time periods in one example. Furthermore, the apparatus 1200 and voltage threshold circuitry 1252, in particular, will also sweep through the "M" number of voltage steps. Thus, the digital engine 1260 may be configured to accumulate an array of M voltage×N time values of the error signals occurring at each M, N combination of values that may be used for calculating the eye pattern of the system. For example, the apparatus 1200 may run through a number of cycles and accumulate the M, N values to populate the array based on a continuous data stream input on the A, B, and C wires for a number of UIs, such as approximately 2000 or more UIs as an example. The accumulation or counting of error signal 1246, 1248, and 1250 may be accomplished using an error counter (not shown) in digital engine 1260, which could be implemented with registers, memory devices, or other suitable circuitry for counting or storing data.

It is noted that the apparatus of FIG. 12 may be implemented on a same chip as the receiver. Thus, the apparatus 1200 may be implemented such that testing used for characterization of the eye diagram and skew measurements may be performed easily without the need for external testing apparatus.

Figure 13:
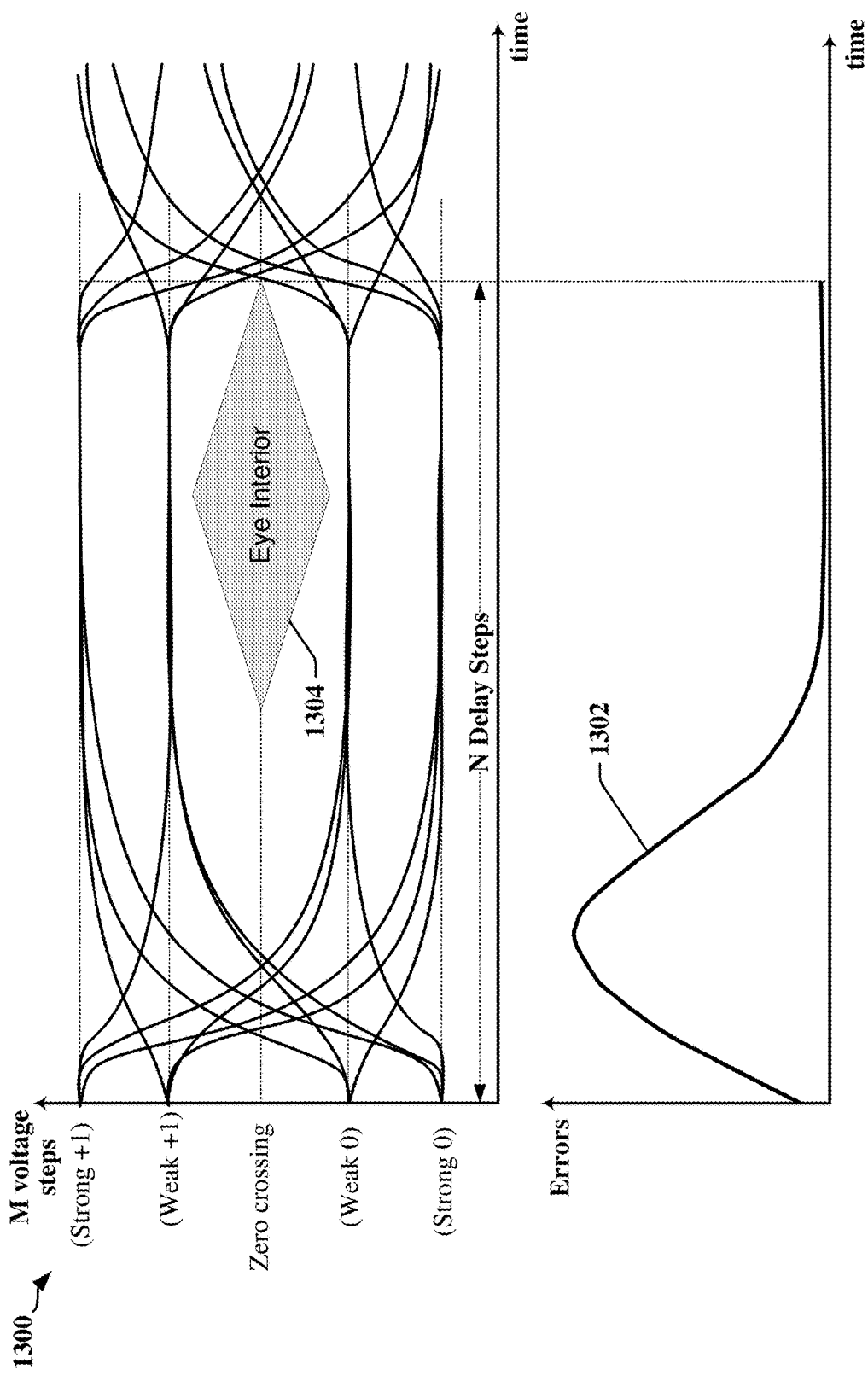
FIG. 13 illustrates an exemplary consolidated error curve that may be generated by the apparatus of FIG. 12.

FIG. 13 illustrates an exemplary eye diagram that may be determined along with a consolidated error curve that may be generated by the apparatus 1200. In this example, the generated consolidated error curve 1302 is determined from the measured array of error signals determined over M voltage steps and N time delay steps over a number of cycles of receiver operation. As may be seen, the error curve 1302 will show a measured higher number of errors during the transition period, with the number of errors diminishing over time after the transition period. From the data in the M×N array, the eye pattern interior 1304 may be accurately calculated and plotted for the three incoming received A, B, and C wire signals in a particular receiver. In a further aspect, it is noted that an eye diagram can be plotted either for each wire alone or for all three wires combined.

Figure 14:
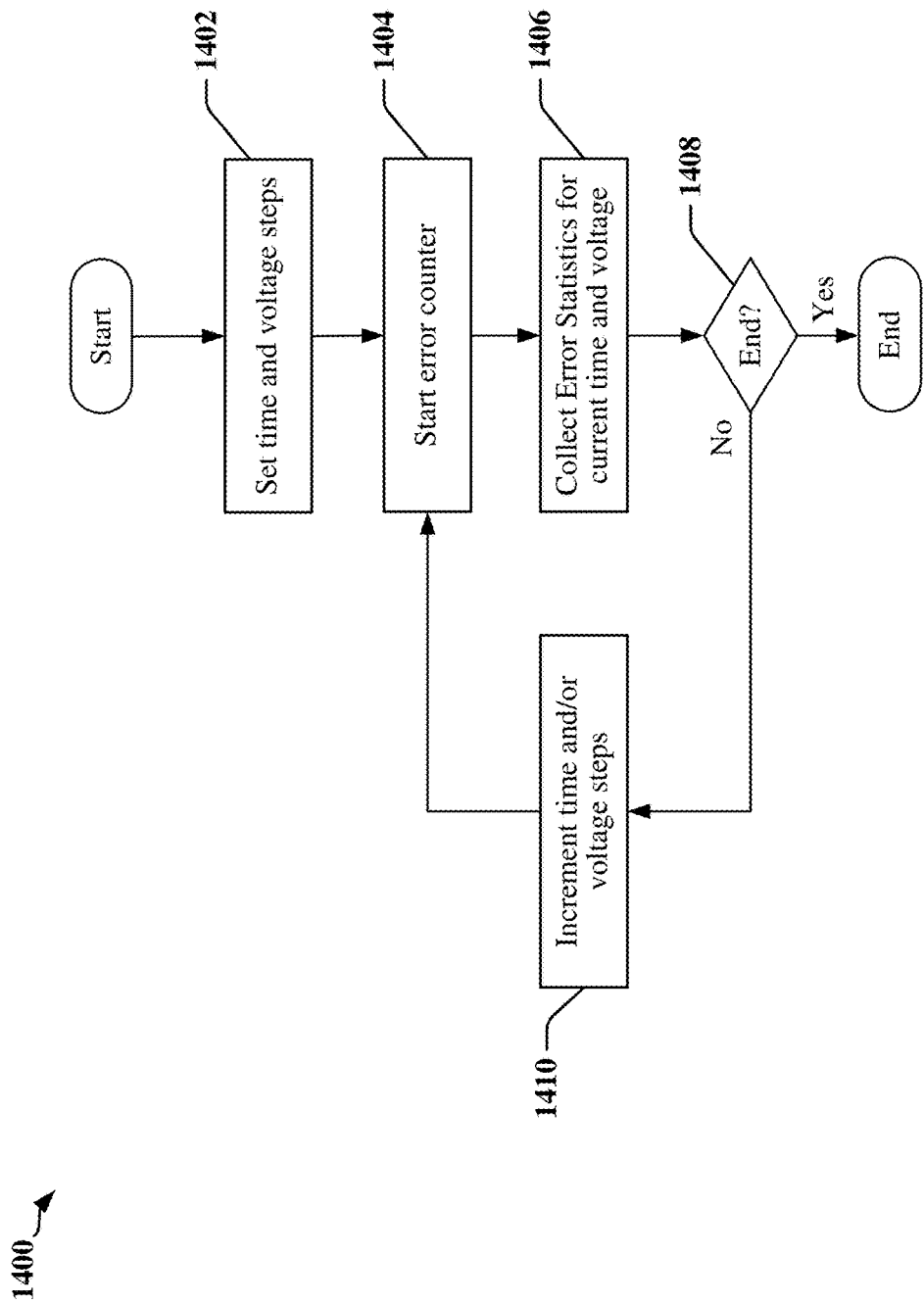
FIG. 14 illustrates a flow diagram of a methodology for measuring error statistics used for eye pattern determination.

FIG. 14 illustrates an exemplary flow diagram of a method 1400 for measuring error signals of one or more of the wires A, B, and/or C using the apparatus 1200. As illustrated, the method 1400 includes first setting initial time and voltage steps (i.e., a particular M voltage offset value and a particular N time delay value) as shown at block 1402. After the initial settings and after the reception of signals on one or more of the A, B, and C wires, flow proceeds to block 1404 where an error counter, which may be implemented within the digital engine 1260, is started for accumulating the error signals 1246, 1248, 1250 or error statistics as further illustrated at block 1406.

Flow next proceeds to determination block 1408 where a determination is made whether the error collection has been completed, i.e., whether the N time delay steps and M voltage offset steps have been completed. If not, flow proceeds to block 1410 where at least one of the time delay steps and voltage steps are incremented to move to a next data point (e.g., (M+1, N)) in the M, N array of collected error statistics. Flow then proceeds back to block 1404 where the error counter is started for collecting the next error statistics. This process continues until all of the data points in the M, N matrix or vector are accumulated.

Figure 15:
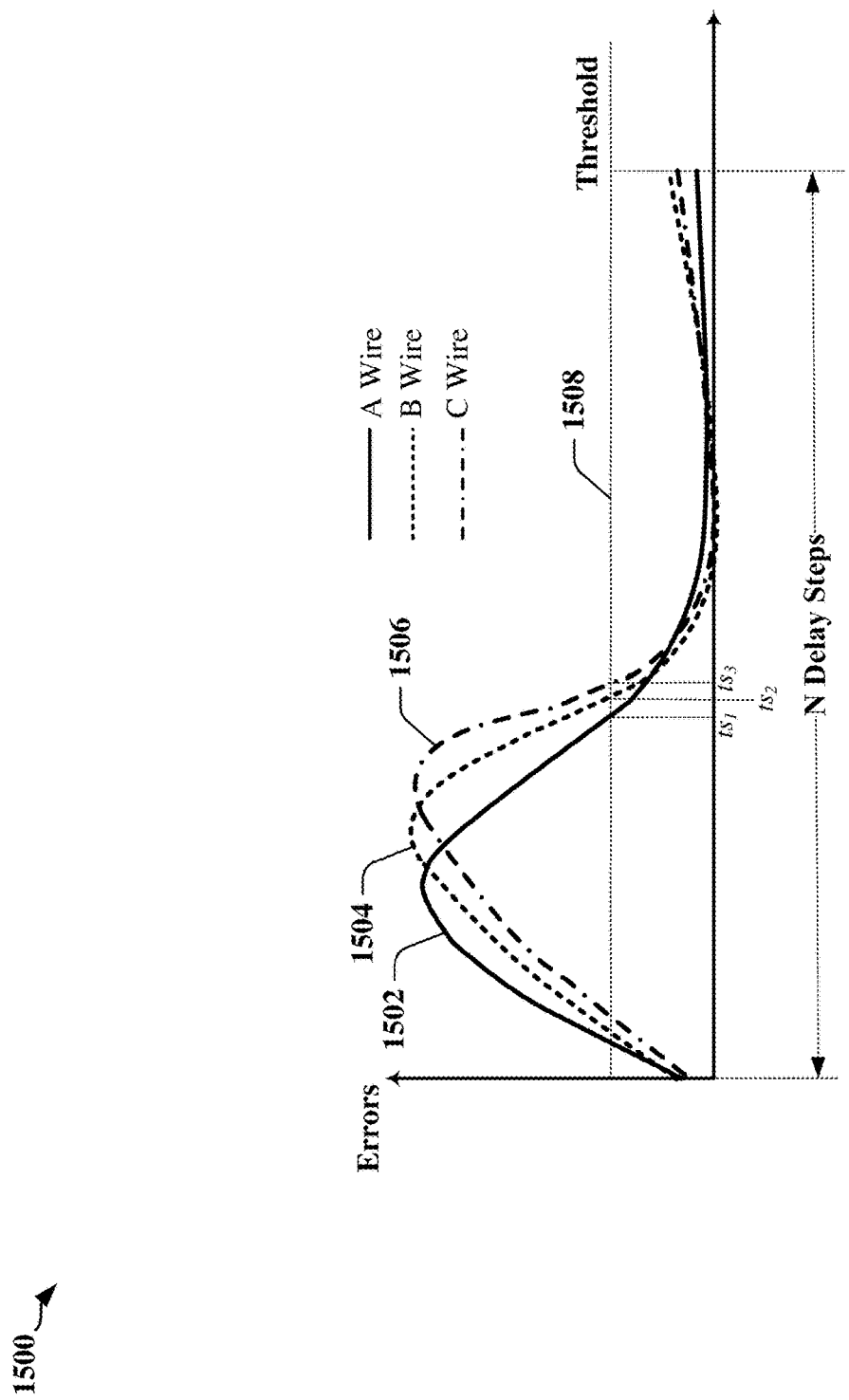
FIG. 15 illustrates a plot of the error curves of the three A, B, and C lines in a C-PHY system over time.

As mentioned above, the apparatus 1200 may also be utilized to measure the skew between the A, B, and C lines which, in this case, is a measurement of the time difference or delta between the error signals generated for the respective A, B, and C wires. As a visual example of how the time skew might occur a receiver, FIG. 15 illustrates a plot of the error curves or vectors of the three A, B, and C lines over time. As shown, the three error curves 1502, 1504, and 1506 generated by the apparatus of FIG. 12 for each respective A, B, and C line may have skew or time differential over the N number of delay steps swept through by the clock time delay circuitry 1214 in apparatus 1200. In order to determine the time differences between the error signals, apparatus 1200, and digital engine 1260, in particular, may be configured to set a particular error threshold 1508. This error threshold is programmable to any of a number of desired thresholds. In one example, error threshold 1508 may be set to approximately an error level that corresponds to the start of the eye pattern or interior 1304 as illustrated in FIG. 13. In an aspect, it is noted that the error threshold 1508 can be determined from previous analyses of eye patterns and may correspond to an error level at the mid-point in the eye transition. As further illustrated, if there is skew between the A, B, and C lines, the error curves 1502, 1504, and 1506 will cross the error threshold 1508 at different times (or particular time delay steps) demarcated as $ts_1$, $ts_2$, and $ts_3$, respectively in this example. The skew may be determined based on the differences between this time or transition time steps $ts_1$, $ts_2$, and $ts_3$. In certain aspects, it is noted that in logic within apparatus 1200, such as digital engine 1260, the error signals 1246, 1248, and 1250, for example may trigger a logic level "1" when the error signal is at or above the threshold 1508, and then a logic level "0" when the error signal falls below the threshold 1508. Thus in this example, the first 1 to 0 transition for each error curve or vector indicates the time step of transition (i.e., ts) of the error signal. Accordingly, the difference among the three transition steps $ts_1$, $ts_2$, and $ts_3$ indicates the A, B and C skew.

Figure 16:
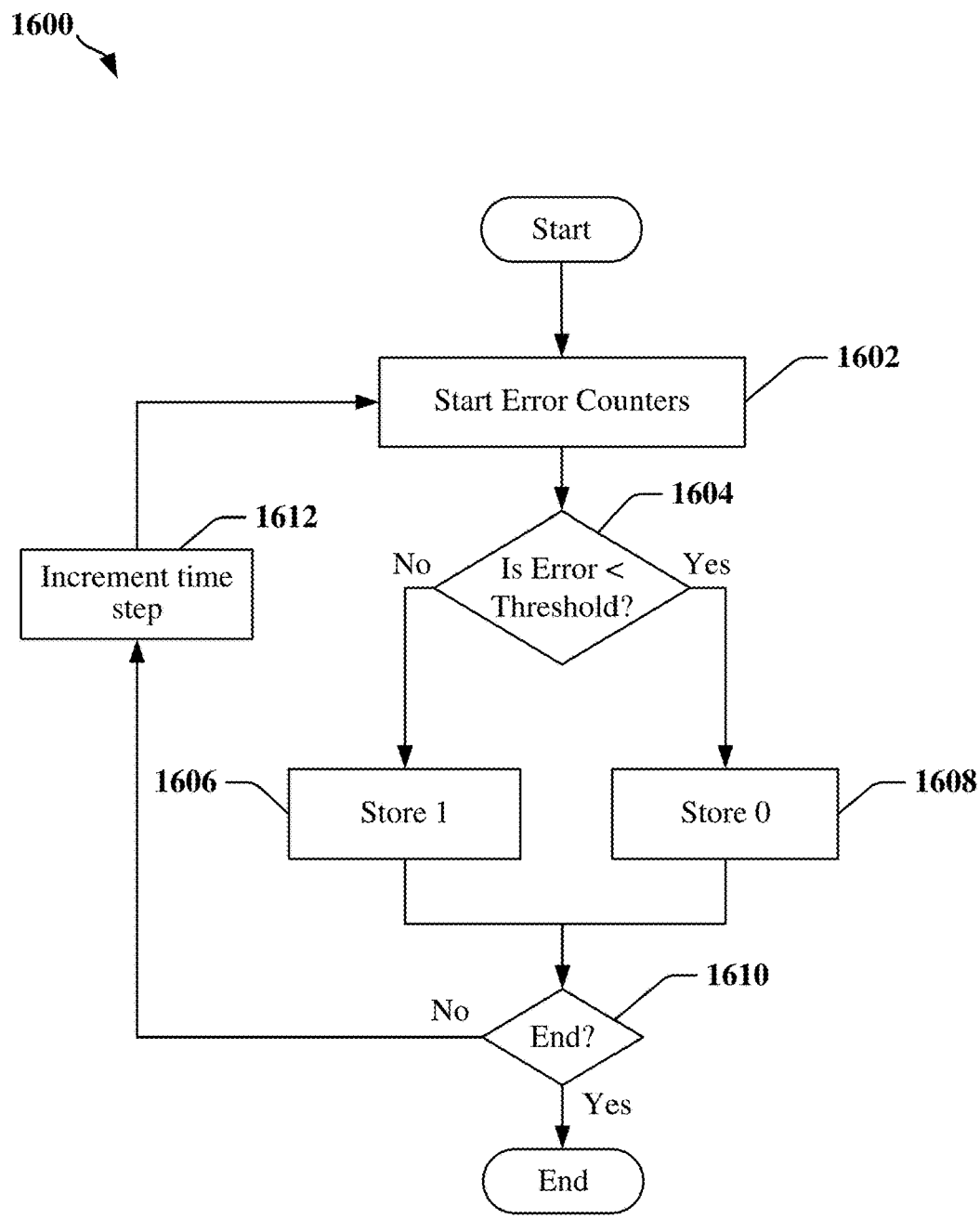
FIG. 16 illustrates a flow diagram of a methodology for measuring or determining inter-line skew using the apparatus of FIG. 12.
Figure 17:
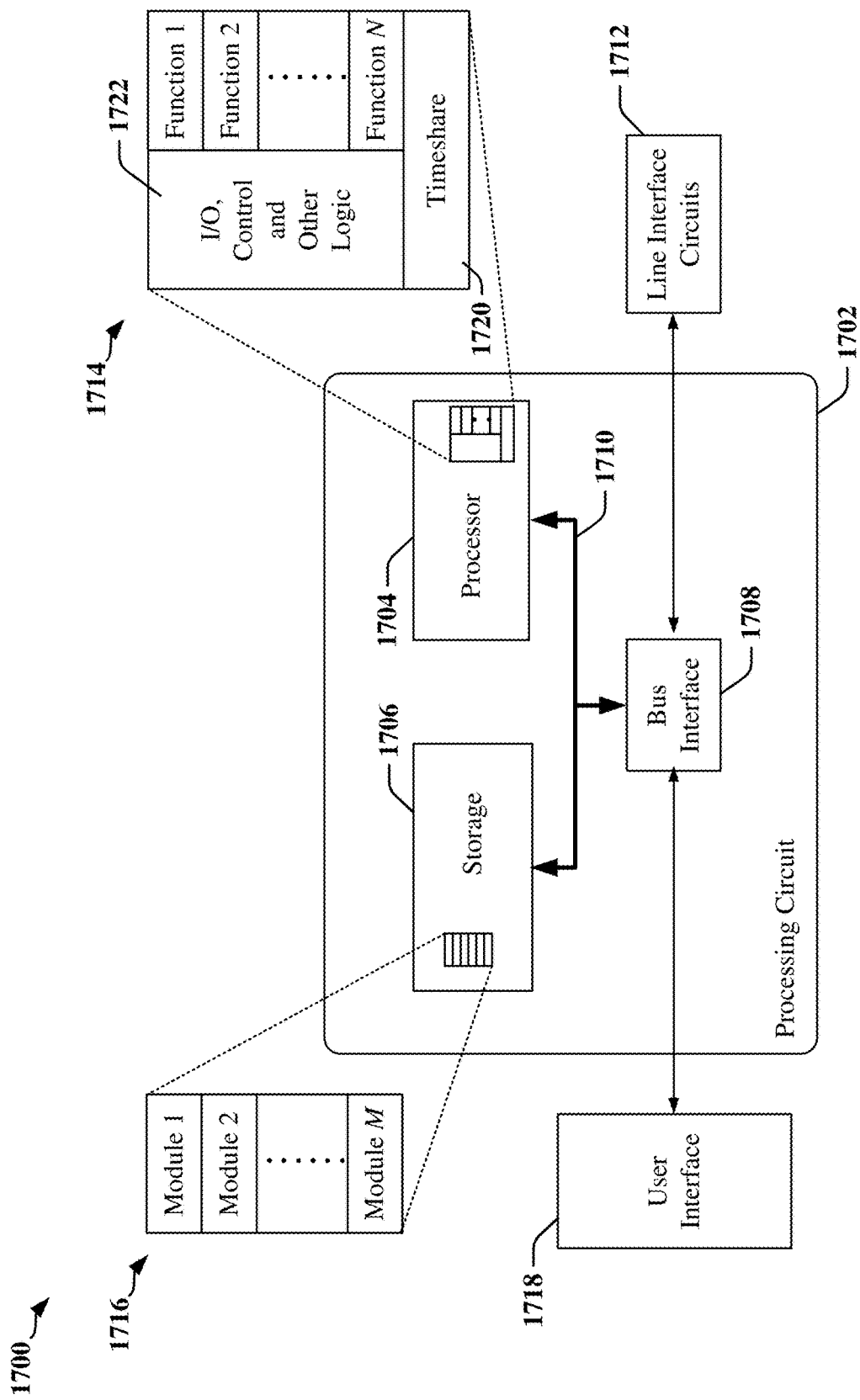
FIG. 17 is a block diagram illustrating an example of an apparatus employing a processing circuit that may be adapted according to certain aspects disclosed herein.

FIG. 16 illustrates a method 1600 for determining skew measurement between lines according to aspects of the present disclosure. As illustrated, method 1600 begins with starting error counters at block 1602. It is noted that the error counters may be implemented within digital engine 1260 in one example. Also, the error signal or vector is for each line A, B, and C may be simultaneously counted, or counted one at a time. Still further, the error counter is determining the error value of the error signals for a particular time step of the N delay steps being swept through.

Flow next proceeds to decision block 1604 where a determination is made whether the error at the particular N delay time step is less than the predetermined threshold amount. If not, a value of "1" is stored as shown at block 1606, whereas if the error level is below the threshold, a value of "0" is stored as shown at block 1608. From both blocks 1606 and 1608, flow proceeds to decision block 1610 to determine whether all of the N delay steps have been swept through. If not, flow proceeds to block 1612 where the time step is incremented and flow proceeds back to block 1602 to measure the error signal at the next time step. The flow of method 1600 continues until all of the N number of time steps have been considered.

Examples of Processing Circuits and Methods

FIG. 16 is a conceptual diagram 1700 illustrating an example of a hardware implementation for an apparatus employing a processing circuit 1702 that may be configured to perform one or more functions disclosed herein. In accordance with various aspects of the disclosure, an element, or any portion of an element, or any combination of elements as disclosed herein may be implemented using the processing circuit 1702. The processing circuit 1702 may include one or more processors 1704 that are controlled by some combination of hardware and software modules. Examples of processors 1704 include microprocessors, microcontrollers, digital signal processors (DSPs), field programmable gate arrays (FPGAs), programmable logic devices (PLDs), state machines, sequencers, gated logic, discrete hardware circuits, and other suitable hardware configured to perform the various functionality described throughout this disclosure. The one or more processors 1704 may include specialized processors that perform specific functions, and that may be configured, augmented or controlled by one of the software modules 1716. The one or more processors 1704 may be configured through a combination of software modules 1716 loaded during initialization, and further configured by loading or unloading one or more software modules 1716 during operation.

In the illustrated example, the processing circuit 1702 may be implemented with a bus architecture, represented generally by the bus 1710. The bus 1710 may include any number of interconnecting buses and bridges depending on the specific application of the processing circuit 1702 and the overall design constraints. The bus 1710 links together various circuits including the one or more processors 1704, and storage 1706. Storage 1706 may include memory devices and mass storage devices, and may be referred to herein as computer-readable media and/or processor-readable media. The bus 1710 may also link various other circuits such as timing sources, timers, peripherals, voltage regulators, and power management circuits. A bus interface 1708 may provide an interface between the bus 1710 and one or more transceivers 1712. A transceiver 1712 may be provided for each networking technology supported by the processing circuit. In some instances, multiple networking technologies may share some or all of the circuitry or processing modules found in a transceiver 1712. Each transceiver 1712 provides a means for communicating with various other apparatus over a transmission medium. Depending upon the nature of the apparatus, a user interface 1718 (e.g., keypad, display, speaker, microphone, joystick) may also be provided, and may be communicatively coupled to the bus 1710 directly or through the bus interface 1708.

A processor 1704 may be responsible for managing the bus 1710 and for general processing that may include the execution of software stored in a computer-readable medium that may include the storage 1706. In this respect, the processing circuit 1702, including the processor 1704, may be used to implement any of the methods, functions and techniques disclosed herein. The storage 1706 may be used for storing data that is manipulated by the processor 1704 when executing software, and the software may be configured to implement any one of the methods disclosed herein.

One or more processors 1704 in the processing circuit 1702 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1706 or in an external computer readable medium. The external computer-readable medium and/or storage 1706 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), a random access memory (RAM), a ROM, a PROM, an erasable PROM (EPROM), an EEPROM, a register, a removable disk, and any other suitable medium for storing software and/or instructions that may be accessed and read by a computer. The computer-readable medium and/or storage 1706 may also include, by way of example, a carrier wave, a transmission line, and any other suitable medium for transmitting software and/or instructions that may be accessed and read by a computer. Computer-readable medium and/or the storage 1706 may reside in the processing circuit 1702, in the processor 1704, external to the processing circuit 1702, or be distributed across multiple entities including the processing circuit 1702. The computer-readable medium and/or storage 1706 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1706 may maintain software maintained and/or organized in loadable code segments, modules, applications, programs, etc., which may be referred to herein as software modules 1716. Each of the software modules 1716 may include instructions and data that, when installed or loaded on the processing circuit 1702 and executed by the one or more processors 1704, contribute to a run-time image 1714 that controls the operation of the one or more processors 1704. When executed, certain instructions may cause the processing circuit 1702 to perform functions in accordance with certain methods, algorithms and processes described herein.

Some of the software modules 1716 may be loaded during initialization of the processing circuit 1702, and these software modules 1716 may configure the processing circuit 1702 to enable performance of the various functions disclosed herein. For example, some software modules 1716 may configure internal devices and/or logic circuits 1722 of the processor 1704, and may manage access to external devices such as the transceiver 1712, the bus interface 1708, the user interface 1718, timers, mathematical coprocessors, and so on. The software modules 1716 may include a control program and/or an operating system that interacts with interrupt handlers and device drivers, and that controls access to various resources provided by the processing circuit 1702. The resources may include memory, processing time, access to the transceiver 1712, the user interface 1718, and so on.

One or more processors 1704 of the processing circuit 1702 may be multifunctional, whereby some of the software modules 1716 are loaded and configured to perform different functions or different instances of the same function. The one or more processors 1704 may additionally be adapted to manage background tasks initiated in response to inputs from the user interface 1718, the transceiver 1712, and device drivers, for example. To support the performance of multiple functions, the one or more processors 1704 may be configured to provide a multitasking environment, whereby each of a plurality of functions is implemented as a set of tasks serviced by the one or more processors 1704 as needed or desired. In one example, the multitasking environment may be implemented using a timesharing program 1720 that passes control of a processor 1704 between different tasks, whereby each task returns control of the one or more processors 1704 to the timesharing program 1720 upon completion of any outstanding operations and/or in response to an input such as an interrupt. When a task has control of the one or more processors 1704, the processing circuit is effectively specialized for the purposes addressed by the function associated with the controlling task. The timesharing program 1720 may include an operating system, a main loop that transfers control on a round-robin basis, a function that allocates control of the one or more processors 1704 in accordance with a prioritization of the functions, and/or an interrupt driven main loop that responds to external events by providing control of the one or more processors 1704 to a handling function.

Figure 18:
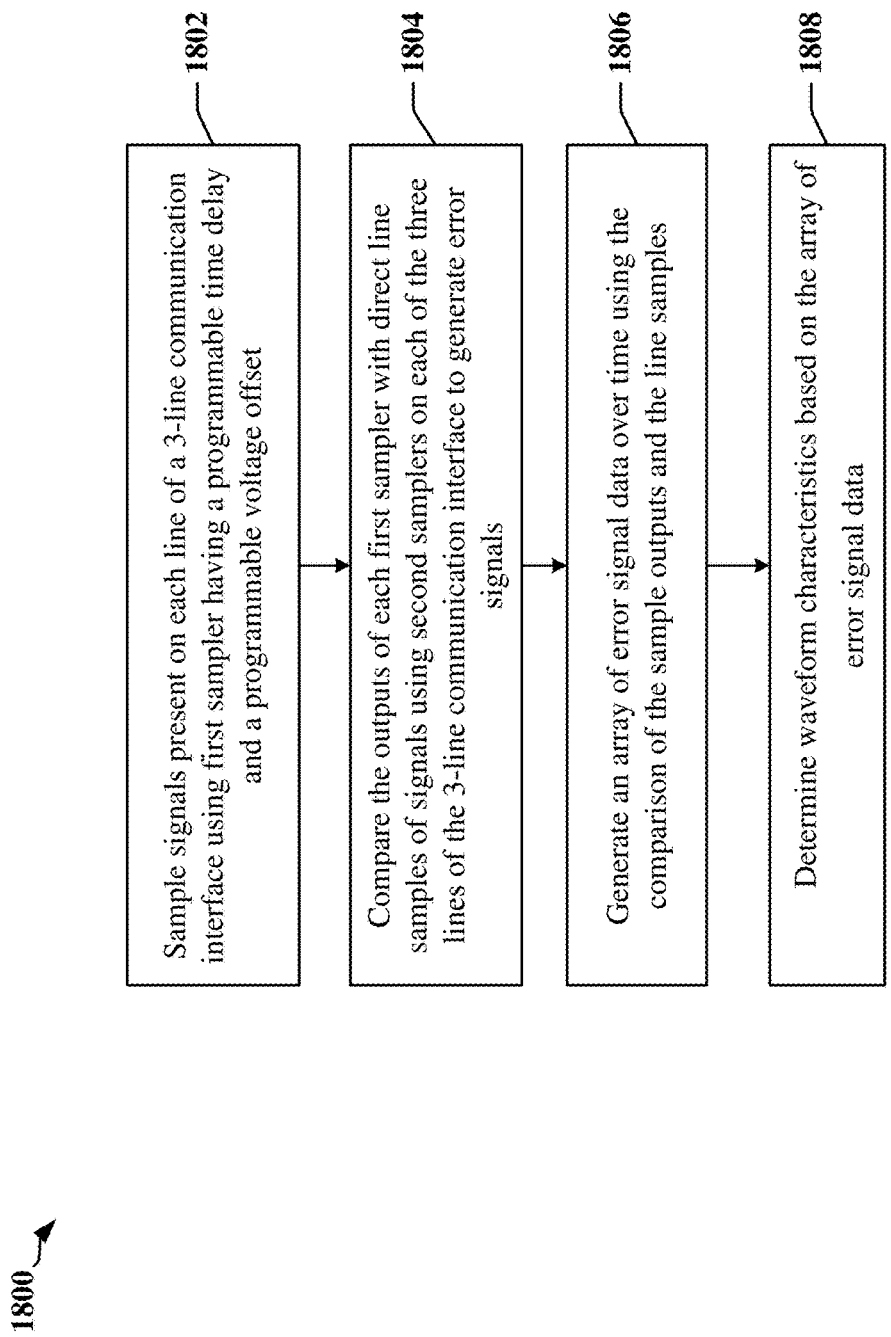
FIG. 18 is a flow chart of a method of clock generation according to certain aspects disclosed herein.

FIG. 18 is a flow chart of a method 1800 for characterizing a waveform received in a data communication device coupled to a 3-line communication interface, such as a C-PHY interface. Method 1800 illustrates a process block 1802 that includes sampling signals present on each line of the 3-line communication interface using a plurality of first samplers (e.g., auxiliary samplers 1202 2014, 1206), where a respective first sampler of the plurality of first samplers samples each line A, B, and C. Additionally, each sampler includes at least one of a programmable time delay and a programmable voltage offset configured to respectively delay the sampled signal by a time amount or determine a voltage offset. As explained before, the programmable time delay may be determined by the clock delay line 1214 and the voltage offset may be determined by the voltage threshold circuit 1252.

Additionally, method 1800 includes comparing the outputs of each first sampler with respective direct line samples of signals on each of the three lines of the 3-line communication interface to generate error signals (e.g., error signals 1246, 1248, 1250) where the direct line samples are sampled using a plurality of second samplers (e.g., samplers 1222, 1224, and 1226), each of which is coupled to a respective line of the 3-line communication interface as illustrated at block 1804.

Further, method 1800 includes generating an array of error signal data over time using the comparison of the sample outputs and the line samples as shown in block 1806. In an aspect, the array is stored and generated within digital engine 1260, but is not limited to such and may be implemented in a processor, ASIC, or equivalents thereof. Finally, method 1800 includes determining waveform characteristics based on the array of error signal data as shown at block 1808. The processes of block 1808 may also be implemented within digital engine 1260, but is not limited to such and may be implemented in a processor, ASIC, or equivalents thereof. As described herein, the waveform characteristic that is determined includes plotting an eye pattern or eye interior as seen at the receiver in order to better understand the present receiver and 3-wire interface for testing and/or tuning purposes.

According to further aspects, the method 1800 may include generating the error signal using one or more XOR logic circuitry configured to compare the outputs of each first and second sampler with respective direct line samples of signals on each of the three lines of the 3-line communication interface to generate the error signals as illustrated by elements XOR elements 1240, 1242, and 1244 shown in FIG. 12. It is noted, however, that the comparison functionality is not limited to an XOR operation, and other comparison functions may be implemented to determine an error signal between the outputs of the first and second groups of samplers.

In still further aspects, method 1800 includes the programmable time delay being based on a recovered clock signal (RCLK) determined in a clock and data recovery (CDR) circuit within a receiver receiving the signals on the 3-line communication interface, such that the time delay is at least one delay step of a predetermined number of delay time steps of the recovered clock signal (e.g., one of the N number of time delay steps). Additionally, method 1800 may further include each delay time step of the predetermined number of time steps being a prescribed delay time behind the recovered clock signal in time. Moreover, the method 1800 may include the programmable voltage offset including a plurality of predetermined voltage steps of voltages at which a first sampler will sample a respective line of the 3-line communication interface.

In still a further aspect, method 1800 may include a mode for determining skew between at least two lines of the three lines of the 3-line interface. While the examples above illustrated determining skew between all 3 lines of the 3-line interface, it is also possible just to consider two of the three, such as the difference between the times of the threshold transition steps of error signal of line A and line B, line B and line C, or line A and line C in some aspects. In particular the method 1800 may include first setting an error signal threshold, and then determining at which time steps of a plurality of time delay steps the error signal from each of the at least two lines respectively falls below the error signal threshold. From these determined time steps, the skew is then determinable between the at least two lines based on the difference of the determined time steps of the respective lines.

Figure 19:
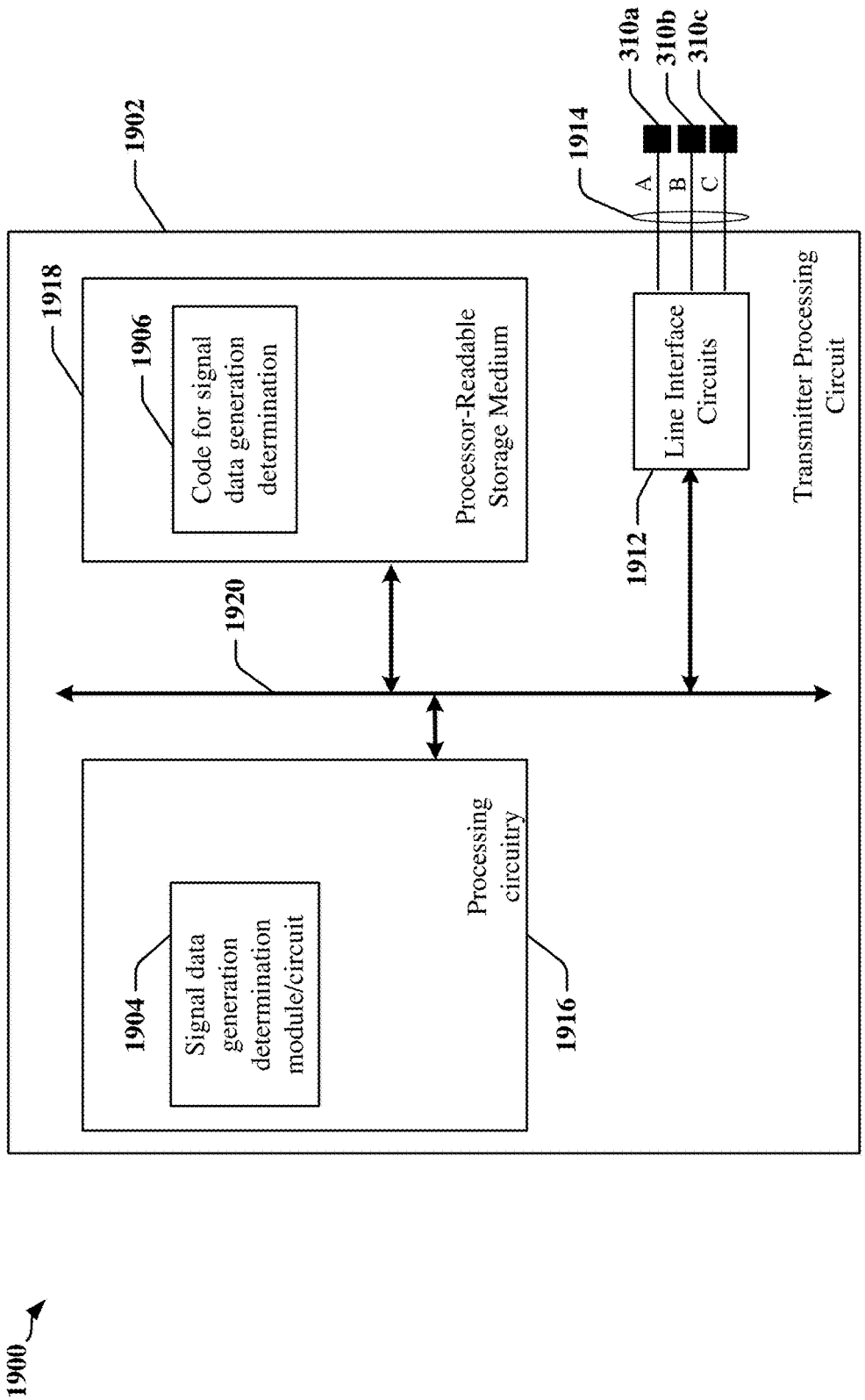
FIG. 19 is a diagram illustrating an example of a hardware implementation for an apparatus employing a processing employing a processing circuit adapted according to certain aspects disclosed herein.

FIG. 19 is a diagram illustrating an example of a hardware implementation for an apparatus 1900 employing a processing circuit 1902. In the illustrated example, processing circuit 1902 may be implemented within a transmitter for a 3-line, multi-phase interface, such as a C-PHY interface. In further aspects, the apparatus 1900 may be implemented as part of a transmitter in a master device, but could also be implemented in a transmitter within a slave device as well.

The processing circuit 1902 typically contains a processor or processing circuitry 1916 that may include one or more of a microprocessor, microcontroller, digital signal processor, a sequencer and a state machine. The processing circuit 1902 may be implemented with a bus architecture, represented generally by the bus 1920. The bus 1920 may include any number of interconnecting buses and bridges depending on the specific application of the processing circuit 1902 and the overall design constraints. The bus 1920 links together various circuits including one or more processors and/or hardware modules, represented by the processor 1916, specific modules or circuits such as a signal data determination module 1904, transmitter/line interface circuits 1912 that send signaling over the various lines, connectors, or wires 1914, and computer-readable storage medium 1918. The bus 1920 may also link various other circuits such as timing sources, peripherals, voltage regulators, and power management circuits, which are well known in the art, and therefore, will not be described any further.

The processor 1916 is responsible for general processing, including the execution of software stored on the computer-readable storage medium 1918. The software, when executed by the processor 1916, causes the processing circuit 1902 to perform the various functions described before for any particular apparatus. The computer-readable storage medium 1918 may also be used for storing data that is manipulated by the processor 1916 when executing software, including data encoding for symbols transmitted over the connectors or wires 1914, which may be configured as data lanes. The processing circuit 1902 further includes at least module 1904, which may be used to provide the continuous source of data to be sent over wires 1914 that is, in turn, used at a receiver to determine measurements of the eye pattern and skew. The modules including module 1904 may be software modules running in the processor 1916, resident/stored in the computer-readable storage medium 1918, one or more hardware modules coupled to the processor 1916, or some combination thereof. The modules including module 1904 may include microcontroller instructions, state machine configuration parameters, or some combination thereof.

In one configuration, the apparatus 1900 may be configured for data communication over a C-PHY 3-phase interface. The apparatus 1900 may include module and/or circuit 1904 that is configured to generate and cause transmission of the calibration pattern discussed above in connection with FIG. 13. Additionally, processor-readable storage medium 1918 may include code 1906 that is configured for causing the processing circuitry 1916 to generate the disclosed calibration pattern.

Figure 20:
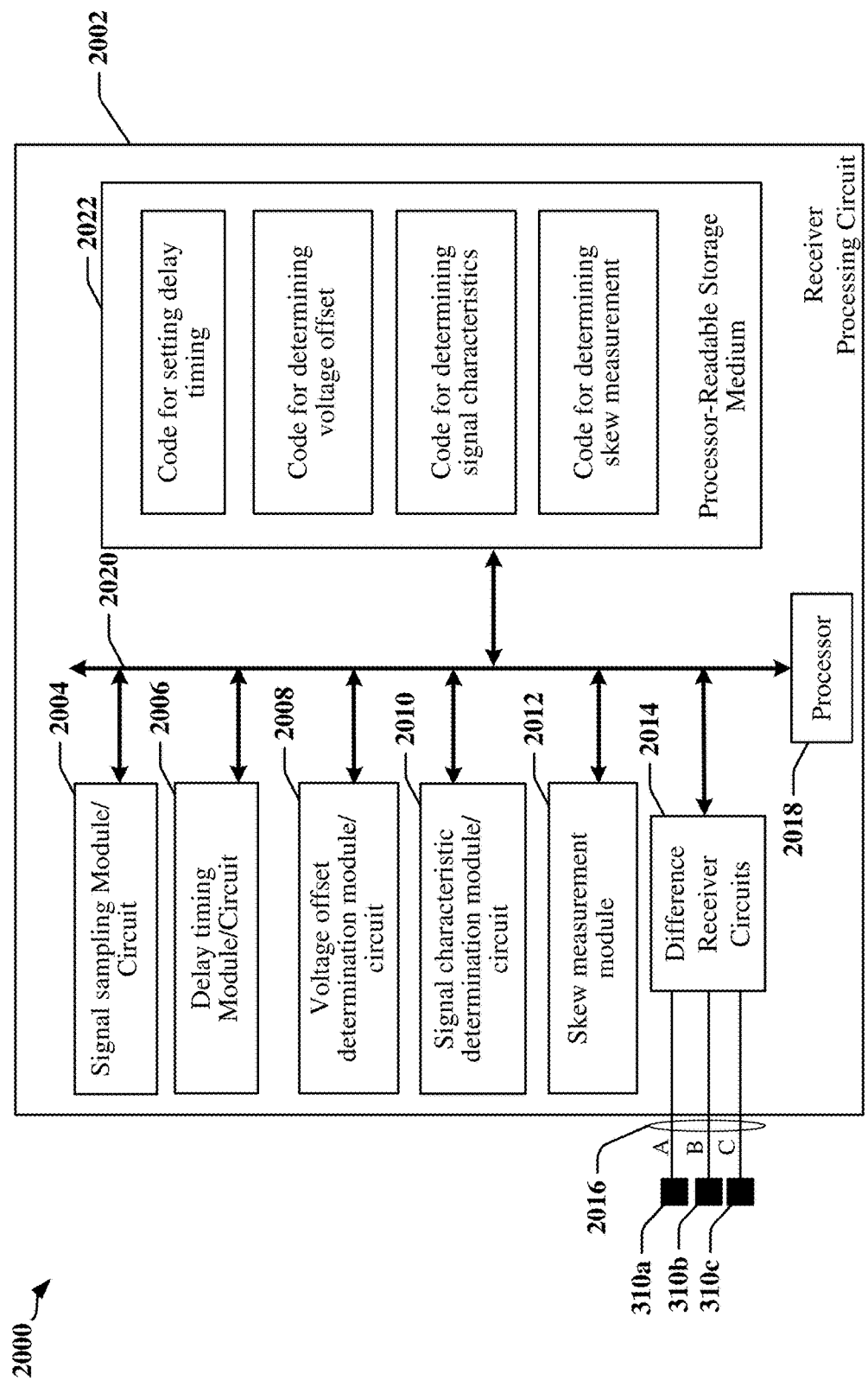
FIG. 20 is a diagram illustrating an example of another hardware implementation for an apparatus employing a processing employing a processing circuit adapted according to certain aspects disclosed herein.

FIG. 20 is a diagram illustrating an example of a hardware implementation for an apparatus 2000 employing a processing circuit 2002. In the illustrated example, processing circuit 2002 may be implemented within a receiver for a 3-line, multi-phase interface, such as a C-PHY interface. In a further example, the apparatus 2000 may be implemented as part of a receiver in slave device, but could also be implemented in a receiver within a master device as well according to certain examples.

The processing circuit 2002 typically contains a processor 2018 that may include one or more of a microprocessor, microcontroller, digital signal processor, a sequencer and a state machine. The processing circuit 2002 may be implemented with a bus architecture, represented generally by the bus 2020. The bus 2020 may include any number of interconnecting buses and bridges depending on the specific application of the processing circuit 2002 and the overall design constraints. The bus 2020 links together various circuits including one or more processors and/or hardware modules, represented by the processor 2018, modules or circuits 2004, 2006, 2008, 2010, and 202, difference receiver circuits 2014 that determine difference signaling state between different pairs of the connectors or wires 2016 and a computer-readable storage medium 2022. The bus 2020 may also link various other circuits such as timing sources, peripherals, voltage regulators, and power management circuits, which are well known in the art, and therefore, will not be described any further.

The processor 2018 is responsible for general processing, including the execution of software or code stored on the computer-readable storage medium 2022. The software or code, when executed by the processor 2018, causes the processing circuit 2002 to perform the various functions described before for any particular apparatus. The computer-readable storage medium 2022 may also be used for storing data that is manipulated by the processor 2018 hen executing software, including data decoded from symbols transmitted over the connectors or wires 2016, which may be configured as data lanes and clock lanes. The processing circuit 2002 further includes at least one of the modules 2004, 2006, 2008, 2010, and 2012. The modules 2004, 2006, 2008, 2010, and 2012 may be software modules running in the processor 2018, resident/stored in the computer-readable storage medium 2022, one or more hardware modules coupled to the processor 2018, or some combination thereof. The modules 2004, 2006, 2008, 2010, and 2012 may include microcontroller instructions, state machine configuration parameters, or some combination thereof.

In one configuration, the apparatus 2000 may be configured for data communication over a C-PHY 3-phase interface. The apparatus 2000 may include a module and/or circuit 2004 that is configured for sampling the signals received over wires 2016 from a transmitter, such as apparatus 1900. The module 2004 may be configured as at least a portion of the circuitry illustrated in FIG. 12; namely, the auxiliary or first samplers 1202, 1204 and 1206 and the normal line or second samplers 1222, 1224, and 1226, and the comparison circuitry (e.g., XOR circuits 1240, 1242, and 1244). Apparatus 2000 may further include a module and/or circuit 2006 for delay timing generation and a module and/or circuit 2008 for voltage offset generation. In an aspect, modules 2006 and 2008 may be implemented, at least in part, by circuitry 1214 and 1253, respectively. It is further noted that modules 2006 and 2008 may also include implementation with software or in conjunction with processor 2018 running software that determines the various time delays and voltage offsets.

In yet further aspects, apparatus 2000 may include a module and/or circuit 2010 for determining signal characteristics including plotting an eye pattern or interior such as illustrated in FIG. 13. It is noted that in certain examples, the module and/or circuit 2010 may be implemented with the digital engine 1260 or suitable equivalents thereof, as well as in conjunction with processor 2018, for example. Furthermore, apparatus 2000 may include a skew measurement module 2012 used for implementing a skew measurement mode as discussed earlier. Skew measurement module may be implemented with the digital engine 1260 or suitable equivalents thereof, as well as in conjunction with processor 2018, for example.

In other examples, the processor-readable storage medium 2022 may include various code or instructions including code for causing the processor 2018 to perform the variously disclosed functions used for measuring the signal characteristics and skew. The apparatus 2000 may be configured for various modes of operation, such as MIPI C-PHY low power mode and high speed data mode.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for characterizing a waveform received in a data communication device coupled to a 3-line communication interface, the method comprising:
    sampling signals present on each line of the 3-line communication interface using a plurality of first samplers, where a respective first sampler of the plurality of first samplers samples each line, wherein each sampler includes at least one of a programmable time delay and a programmable voltage offset configured to respectively delay the sampled signal by a time amount or determine a voltage offset;
    comparing the outputs of each first sampler with respective direct line samples of signals on each of the three lines of the 3-line communication interface to generate error signals, where the direct line samples are sampled using a plurality of second samplers, each of which is coupled to a respective line of the 3-line communication interface;
    generating an array of error signal data over time using the comparison of the sample outputs and the line samples; and
    determining waveform characteristics based on the array of error signal data.

2. The method of claim 1, wherein the determined waveform characteristics include a determined eye pattern.

3. The method of claim 1, wherein the error signals are generated using one or more XOR logic circuitry configured to compare the outputs of each first and second sampler with respective direct line samples of signals on each of the three lines of the 3-line communication interface to generate the error signals.

4. The method of claim 1, wherein the programmable time delay is based on a recovered clock signal determined in a clock and data recovery circuit within a receiver receiving the signals on the 3-line communication interface, such that the time delay is at least one delay step of a predetermined number of delay time steps of the recovered clock signal.

5. The method of claim 4, wherein each delay time step of the predetermined number of time steps is a prescribed delay time behind the recovered clock signal.

6. The method of claim 1, wherein the programmable voltage offset includes a plurality of predetermined voltage steps of voltages at which a first sampler will sample a respective line of the 3-line communication interface.

7. The method of claim 1, further comprising:
    determining skew between at least two lines of the three lines of the 3-line interface, comprising:
        setting an error signal threshold;
        determining at which time steps of a plurality of time delay steps the error signal from each of the at least two lines respectively falls below the error signal threshold; and
        determining the skew between the at least two lines based on the difference of the determined time steps of the respective lines.

8. The method of claim 1, wherein the 3-line interface is a C-PHY interface.

9. An apparatus for characterizing a waveform received in a data communication device coupled to a 3-line communication interface, comprising:
- means for sampling signals present on each line of the 3-line communication interface using a plurality of first samplers, where a respective first sampler of the plurality of first samplers samples each line, wherein each sampler includes at least one of a programmable time delay and a programmable voltage offset configured to respectively delay the sampled signal by a time amount or determine a voltage offset;
- means for sampling direct line signals using a plurality of second samplers,
- means for comparing the outputs of each first sampler with respective direct line samples from each of the second samplers for each of the three lines of the 3-line communication interface to generate error signals;
- means for generating an array of error signal data over time using the comparison of the sample outputs and the line samples from the means for comparing; and
- means for determining waveform characteristics based on the array of error signal data.

10. The apparatus of claim 9, wherein the determined waveform characteristics include a determined eye pattern.

11. The apparatus of claim 9, wherein the means for comparing includes one or more XOR logic circuitry configured to compare the outputs of each first and second sampler with respective direct line samples of signals on each of the three lines of the 3-line communication interface to generate the error signals.

12. The apparatus of claim 9, wherein the programmable time delay is based on a recovered clock signal determined in a clock and data recovery circuit within a receiver receiving the signals on the 3-line communication interface, such that the time delay is at least one delay step of a predetermined number of delay time steps of the recovered clock signal.

13. The apparatus of claim 12, wherein each delay time step of the predetermined number of time steps is a prescribed delay time behind the recovered clock signal.

14. The apparatus of claim 9, wherein the programmable voltage offset includes a plurality of predetermined voltage steps of voltages at which a first sampler will sample a respective line of the 3-line communication interface.

15. The apparatus of claim 9, further comprising:
means for determining skew between at least two lines of the three lines of the 3-line interface, comprising:
- means for setting an error signal threshold;
- means for determining at which time steps of a plurality of time delay steps the error signal from each of the at least two lines respectively falls below the error signal threshold; and
- means for determining the skew between the at least two lines based on the difference of the determined time steps of the respective lines.

16. The apparatus of claim 9, wherein the 3-line interface is a C-PHY interface.

17. A non-transitory processor readable storage medium comprising code for:
- sampling signals present on each line of a 3-line communication interface using a plurality of first samplers, where a respective first sampler of the plurality of first samplers samples each line, wherein each sampler includes at least one of a programmable time delay and a programmable voltage offset configured to respectively delay the sampled signal by a time amount or determine a voltage offset;
- comparing the outputs of each first sampler with respective direct line samples of signals on each of the three lines of the 3-line communication interface to generate error signals, where the direct line samples are sampled using a plurality of second samplers, each of which is coupled to a respective line of the 3-line communication interface;
- generating an array of error signal data over time using the comparison of the sample outputs and the line samples; and
- determining waveform characteristics based on the array of error signal data.

18. The processor readable storage medium of claim 17, wherein the determined waveform characteristics include a determined eye pattern.

19. The processor readable storage medium of claim 17, wherein the error signals are generated using one or more XOR logic circuitry configured to compare the outputs of each first and second sampler with respective direct line samples of signals on each of the three lines of the 3-line communication interface to generate the error signals.

20. The processor readable storage medium of claim 17, wherein the programmable time delay is based on a recovered clock signal determined in a clock and data recovery circuit within a receiver receiving the signals on the 3-line communication interface, such that the time delay is at least one delay step of a predetermined number of delay time steps of the recovered clock signal.

21. The processor readable storage medium of claim 20, wherein each delay time step of the predetermined number of time steps is a prescribed delay time behind the recovered clock signal.

22. The processor readable storage medium of claim 17, wherein the programmable voltage offset includes a plurality of predetermined voltage steps of voltages at which a first sampler will sample a respective line of the 3-line communication interface.

23. The processor readable storage medium of claim 17, further comprising code for:
determining skew between at least two lines of the three lines of the 3-line interface, comprising:
- setting an error signal threshold;
- determining at which time steps of a plurality of time delay steps the error signal from each of the at least two lines respectively falls below the error signal threshold; and
- determining the skew between the at least two lines based on the difference of the determined time steps of the respective lines.

24. The processor readable storage medium of claim 17, wherein the 3-line interface is a C-PHY interface.

25. A system for characterizing a waveform received in a data communication device coupled to a 3-line communication interface, the system comprising:
- a first sampling circuitry in a receiver that is configured to sample signals present on each line of the 3-line communication interface, wherein the first sampling circuity includes at least one of a programmable time delay and a programmable voltage offset configured to respectively delay the sampled signal by a time delay amount or determine a voltage offset;
- a second sampling circuitry in the receiver that is configured to directly sample the signal on each line of the 3-line communication interface;
- a comparison circuitry configured to compare the outputs of the first sampling circuitry and the second sampling circuitry over a plurality of time delay amounts and a plurality of voltage offsets to generate a plurality of error signals;

an error signal array generator configured to generate an array of error signal data over time using the plurality of error signals; and a waveform characteristic determination circuitry configured to determine waveform characteristics of the signals received on the 3-line communication interface based on the array of error signal data.

26. The system of claim 25, wherein the determined waveform characteristics include a determined eye pattern.

27. The system of claim 25, wherein the programmable time delay is based on a recovered clock signal determined in a clock and data recovery circuit within a receiver receiving the signals on the 3-line communication interface, such that the time delay is at least one delay step of a predetermined number of delay time steps of the recovered clock signal.

28. The system of claim 25, wherein the programmable voltage offset includes a plurality of predetermined voltage steps of voltages at which a first sampler will sample a respective line of the 3-line communication interface.

29. The system of claim 25, further comprising:

skew determination circuitry configured for determining skew between at least two lines of the three lines of the 3-line interface, the circuitry comprising:

circuitry for setting an error signal threshold;

circuitry for determining at which time steps of a plurality of time delay steps the error signal from each of the at least two lines respectively falls below the error signal threshold; and circuitry for determining the skew between the at least two lines based on the difference of the determined time steps of the respective lines.

30. The system of claim 25, wherein the 3-line interface is a C-PHY interface.

* * * * *